(12) United States Patent
Okazawa et al.

(10) Patent No.: US 10,671,232 B2
(45) Date of Patent: *Jun. 2, 2020

(54) INFORMATION PROCESSING APPARATUS, AND PART GENERATING AND USING METHOD

(71) Applicant: SONY CORPORATION, Tokyo (JP)

(72) Inventors: Kae Okazawa, Kanagawa (JP); Junichirou Sakata, Tokyo (JP); Masahiro Takahashi, Kanagawa (JP); Kazuma Takahashi, Chiba (JP); Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 15/864,726

(22) Filed: Jan. 8, 2018

(65) Prior Publication Data

US 2018/0129326 A1 May 10, 2018

Related U.S. Application Data

(63) Continuation of application No. 14/266,254, filed on Apr. 30, 2014, now Pat. No. 9,904,433.

(30) Foreign Application Priority Data

May 14, 2013 (JP) ................................. 2013-102031

(51) Int. Cl.
*G06F 3/048* (2013.01)
*H04M 1/725* (2006.01)
(Continued)

(52) U.S. Cl.
CPC ............. *G06F 3/048* (2013.01); *G06Q 10/10* (2013.01); *G06Q 50/01* (2013.01); *H04M 1/72555* (2013.01)

(58) Field of Classification Search
CPC ....... G06F 3/048; G06F 15/173; G06Q 10/10; G06Q 50/01
See application file for complete search history.

(56) References Cited

U.S. PATENT DOCUMENTS 7,559,034 B1 7/2009 Paperny et al.
8,365,081 B1 1/2013 Amacker et al.
(Continued)

FOREIGN PATENT DOCUMENTS

JP 2003-280083 A 10/2003

OTHER PUBLICATIONS

Notice of Allowance for U.S. Appl. No. 14/266,254, dated Oct. 6, 2017, 14 pages.

(Continued)

*Primary Examiner* — Mahelet Shiberou
(74) *Attorney, Agent, or Firm* — Chip Law Group

(57) ABSTRACT

There is provided an information processing apparatus including a part generation unit configured to generate a part that is suitable for a predetermined application and that includes at least a portion of any photo and is displayed on a display screen at a time of execution of the application, and an application control unit configured to control the execution of the application and at least display the part on the display screen during the execution of the application.

18 Claims, 10 Drawing Sheets

(51) Int. Cl.
*G06Q 10/10* (2012.01)
*G06Q 50/00* (2012.01)

(56) References Cited

U.S. PATENT DOCUMENTS

| | | | |
|---|---|---|---|
| 2004/0215731 A1* | 10/2004 | Tzann-en Szeto | H04L 51/04 709/207 |
| 2007/0054679 A1 | 3/2007 | Cho et al. | |
| 2007/0070181 A1* | 3/2007 | Oh | G06T 11/00 348/14.02 |
| 2007/0168878 A1 | 7/2007 | Berstis et al. | |
| 2008/0096593 A1 | 4/2008 | Park | |
| 2008/0140520 A1 | 6/2008 | Hyder et al. | |
| 2009/0037477 A1 | 2/2009 | Choi et al. | |
| 2009/0207138 A1 | 8/2009 | Thorn | |
| 2011/0115945 A1 | 5/2011 | Takano et al. | |
| 2011/0135153 A1 | 6/2011 | Tsurumi et al. | |
| 2012/0157134 A1 | 6/2012 | Lee et al. | |
| 2013/0117653 A1 | 5/2013 | Sukhanov et al. | |
| 2014/0104320 A1 | 4/2014 | Davidson et al. | |
| 2014/0173460 A1 | 6/2014 | Kim | |
| 2016/0196049 A1 | 7/2016 | Iwatsuki et al. | |

OTHER PUBLICATIONS

Advisory Action for U.S. Appl. No. 14/266,254, dated Mar. 20, 2017, 03 pages.
Non-Final Office Action for U.S. Appl. No. 14/266,254, dated Jun. 2, 2017, 20 pages.
Final Office Action for U.S. Appl. No. 14/266,254, dated Jan. 12, 2017, 20 pages.
Non-Final Office Action for U.S. Appl. No. 14/266,254, dated Aug. 22, 2016, 21 pages.

* cited by examiner

FIG. 5
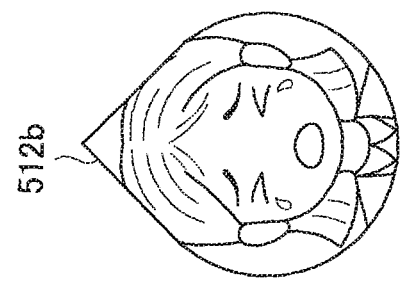
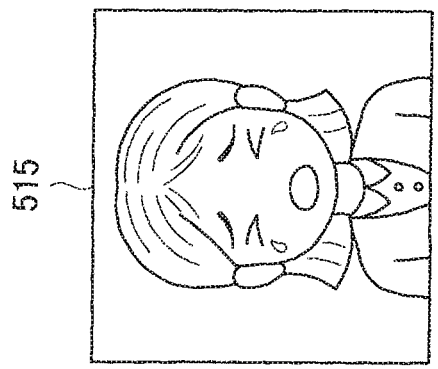
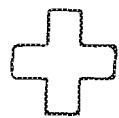
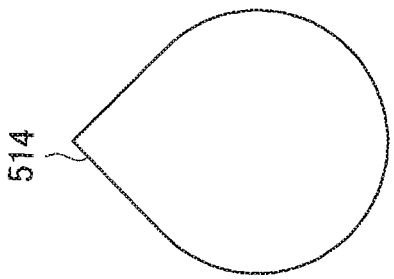

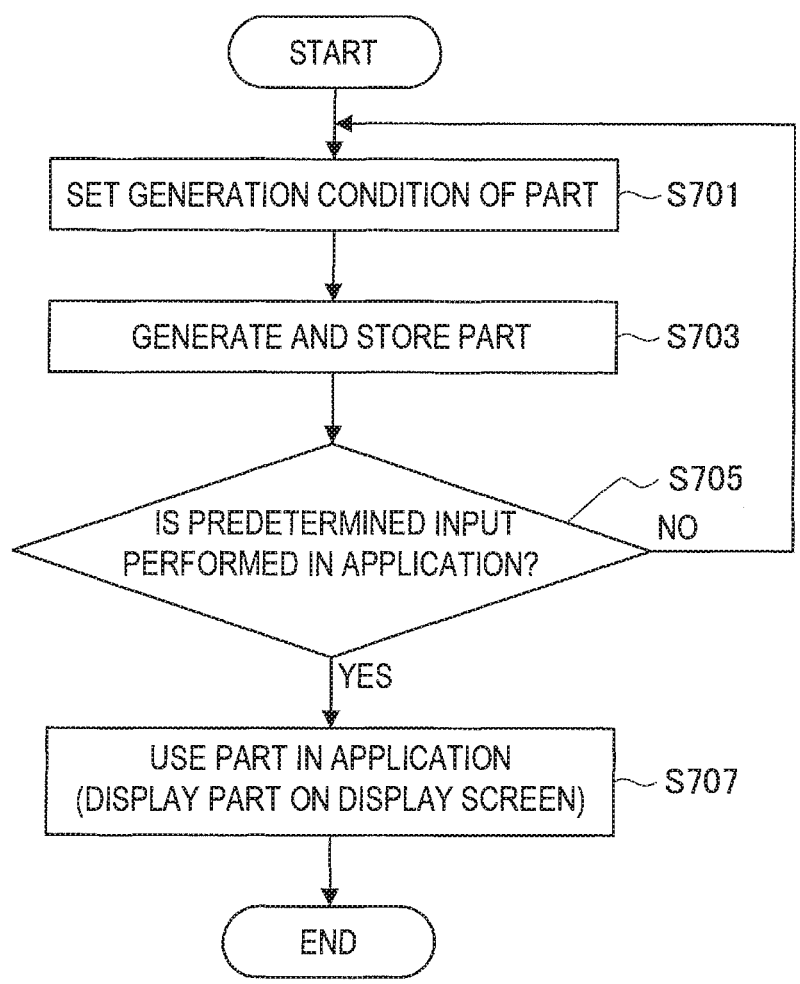

INFORMATION PROCESSING APPARATUS, AND PART GENERATING AND USING METHOD

CROSS REFERENCE TO RELATED APPLICATIONS

The present application is a continuation application of U.S. patent application Ser. No. 14/266,254, filed Apr. 30, 2014, which claims priority from prior Japanese Priority Patent Application JP 2013-102031 filed in the Japan Patent Office on May 14, 2013, the entire contents of which are hereby incorporated by reference.

BACKGROUND

The present disclosure relates to an information processing apparatus, a part generating and using method, and a program.

Communication using photos has generally been performed in various applications executed in information processing apparatuses such as personal computers (PCs), smartphones, and tablet PCs. For example, diverse communication not restricted to only text information is realized between users by transmitting and receiving messages to which photos are appended in mail software (mailers) or by exchanging photos together with messages in instant messengers.

In use of such photos, diverse photos are also preferably prepared to improve the degree of freedom for users to select photos. Technologies regarding photography of photos have been suggested so that users can perform photography with a higher degree of freedom. For example, JP 2003-280083A discloses a technology capable of providing photos in which backgrounds desired by users are used by superimposing a plurality of curtains and forming the backgrounds of the users at the time of photography of the photos.

SUMMARY

However, even when photos desired by users can be taken using the technology disclosed in, for example, JP 2003-280083A, the photos have not been associated with a predetermined application in the related art at the time of use of the photos taken in the application. For example, since a storage area in which data of a photo is stored is not managed by an application, it is necessary for a user to designate the storage area in which the data of the photo is stored and search for a desired photo from the storage area when selecting the photo to be used in an application. Also, since data sizes, data formats, or the like of the photos are not suitable for the application, smooth use of the photos in the application has been difficult.

In view of the above-mentioned circumstances, it is necessary for users to use photos more simply and more conveniently when the users use the photos in an application. Accordingly, it is desirable to provide a novel and improved information processing apparatus, a novel and improved part generating and using method, and a novel and improved program capable of further improving convenience of a user at the time of use of an application.

According to an embodiment of the present disclosure, there is provided an information processing apparatus including a part generation unit configured to generate a part that is suitable for a predetermined application and that includes at least a portion of any photo and is displayed on a display screen at a time of execution of the application, and an application control unit configured to control the execution of the application and at least display the part on the display screen during the execution of the application.

According to an embodiment of the present disclosure, there is provided a part generating and using method including generating a part that is suitable for a predetermined application and that includes at least a portion of any photo and is displayed on a display screen at a time of execution of the application, and controlling the execution of the application and at least displaying the part on the display screen during the execution of the application.

According to an embodiment of the present disclosure, there is provided a program causing a computer to realize a function of generating a part that is suitable for a predetermined application and that includes at least a portion of any photo and is displayed on a display screen at a time of execution of the application, and a function of controlling the execution of the application and at least displaying the part on the display screen during the execution of the application.

According to an embodiment of the present disclosure, the part that is suitable for the predetermined application and that includes at least the portion of any photo and is displayed on the display screen by the application is generated. Then, the generated part is displayed on the display screen during the execution of the application. Thus, the user can use the photo in the application more simply by using the photo as one part of the application. Accordingly, the convenience of the user at the time of the use of the application is improved.

According to one or more embodiments of the present disclosure described above, it is possible to further improve convenience of a user at the time of use of an application.

BRIEF DESCRIPTION OF THE DRAWINGS

FIG. 5 is an explanatory diagram for describing the configuration of the stamp according to the present embodiment;

FIG. 7 is a flowchart showing an example of a processing order of a part generating and using method according to the embodiment of the present disclosure.

DETAILED DESCRIPTION OF THE EMBODIMENTS

Figure 1:
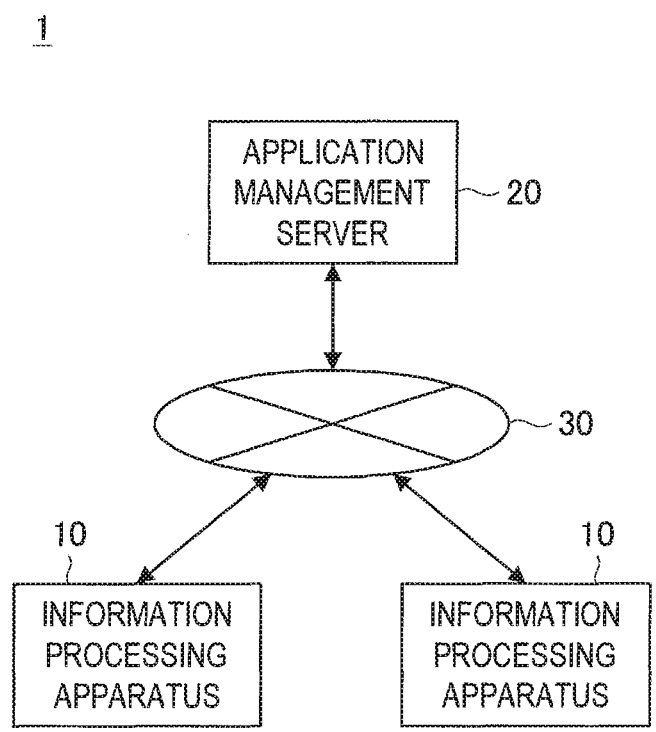
FIG. 1 is a functional block diagram showing an example of the configuration of a part generating and using system according to an embodiment of the present disclosure.

Hereinafter, preferred embodiments of the present disclosure will be described in detail with reference to the appended drawings. Note that, in this specification and the appended drawings, the same reference numerals are given to constituent elements having substantially the same functional configuration and repeated description thereof will be omitted.

The description will be made in the following order.
1. Configuration of part generating and using system
2. Configuration of information processing apparatus
3. Specific examples of part generating and using process
3-1. Case in which part is stamp
3-2. Case in which part is background image
4. Processing order of part generating and using method
5. Hardware configuration
6. Conclusion

1. CONFIGURATION OF PART GENERATING AND USING SYSTEM

In an embodiment of the present disclosure, a part that is suitable for a predetermined application and that includes at least a portion of any photo and is displayed on a display screen at the time of execution of the application is generated by processing any photo in a format suitable for the application. Also, the part generated during the execution of the application is displayed on the display screen. In the following description, a series of processes including at least the above process and performed in the present embodiment is referred to as a part generating and using process.

First, an example of the configuration of a part generating and using system configured to realize the part generating and using process according to the embodiment of the present disclosure will be described with reference to FIG. 1. FIG. 1 is a functional block diagram showing an example of the configuration of the part generating and using system according to the embodiment of the present disclosure.

Referring to FIG. 1, a part generating and using system 1 according to the embodiment of the present disclosure is configured such that information processing apparatuses 10 and an application management server 20 are connected by a communication network (network) 30 to perform mutual communication.

The information processing apparatus 10 is an information processing terminal that executes various applications by transmitting and receiving various kinds of information to and from the application management server 20. The information processing apparatus 10 reflects various kinds of information input from a user during execution of an application to control the application or performs a process of outputting various kinds of information obtainable through the execution of the application to the user. Examples of the information processing apparatus 10 may include various information processing terminals such as a PC, a smartphone, and a tablet PC. Also, the example in which the part generating and using system 1 includes two information processing apparatuses 10 is shown in FIG. 1, but the part generating and using system 1 according to the present embodiment is not limited to this example. The single information processing apparatus 10 may be provided or a number of information processing apparatuses 10 greater than two may be connected via the network 30.

The application management server 20 controls execution of various applications and manages various kinds of information processed by the applications. For example, when the application is an application performing communication between a plurality of users, such as various services in mail software (a mailer) and a Social Networking Service (SNS) or an instant messenger, the application management server 20 can manage user ID information registered in the application, account information such as password information, or information such as mutually transmitted and received messages and can execute the application so that the messages or the like are shared within a range of specific users.

Here, a part used in various applications will be described. In the present embodiment, the part refers to information that has a format suitable for a predetermined application and means information used to execute the application. Specifically, the part according to the present embodiment is a part that is suitable for a predetermined application and that includes at least a portion of any photo and is displayed on a display screen at the time of the execution of the application. The information processing apparatus 10 according to the present embodiment can generate such a part and display the part generated at the time of execution of an application. Also, in the following description, the term "photo" can include the meaning of "photo data" to be subjected to information processing in the part generating and using system 1 according to the present embodiment.

For example, when the information processing apparatus 10 attempts to process photo data and image data at the time of execution of an application and the photo data or the image data has a context different from the application (for example, when the photo data or the image data is acquired by another application), the photo data or the image data does not have a format suitable for the application, and therefore there is a possibility of a process not being smoothly performed. Specifically, for example, when a user attempts to transmit photo data to another user in an application (for example, an instant messenger) performing communication between the users and the photo data is not suitable for the application, a storage area in which the photo data is stored is not managed by the application. Therefore, there is an inconvenience that the user has to designate the storage area in which the photo data attempted to be transmitted by the user is stored, for example, a local storage unit or an external storage unit, and search for a desired photo in the storage area. Also, likewise, when the same photo data to be transmitted is not suitable for the application, there is a possibility that it is necessary to change the data size or the data format of the photo data to be transmitted according to an application to be used. Therefore, there is an inconvenience that the photo data may not be smoothly transmitted. On the other hand, in the present embodiment, a part that is suitable for a predetermined application and that includes at least a portion of a photo of the photo data is generated from the photo data by the information processing apparatus 10. Since the part is suitable for the application, the storage area in which the photo data is stored is under management of the application. Also, the data size or the data format of the part is configured to be suitable for use in the application. Accordingly, in the present embodiment, since the user can use the part generated from the photo data instead of the photo data at the time of the execution of the application, the user can select and use a desired photo more simply, and therefore convenience of the user is further improved.

The example of the configuration of the part generating and using system 1 according to the present embodiment has been described above with reference to FIG. 1. Next, functions and configurations of the information processing apparatus 10 included in the part generating and using system 1 will be described in more detail.

2. CONFIGURATION OF INFORMATION PROCESSING APPARATUS

Figure 2:
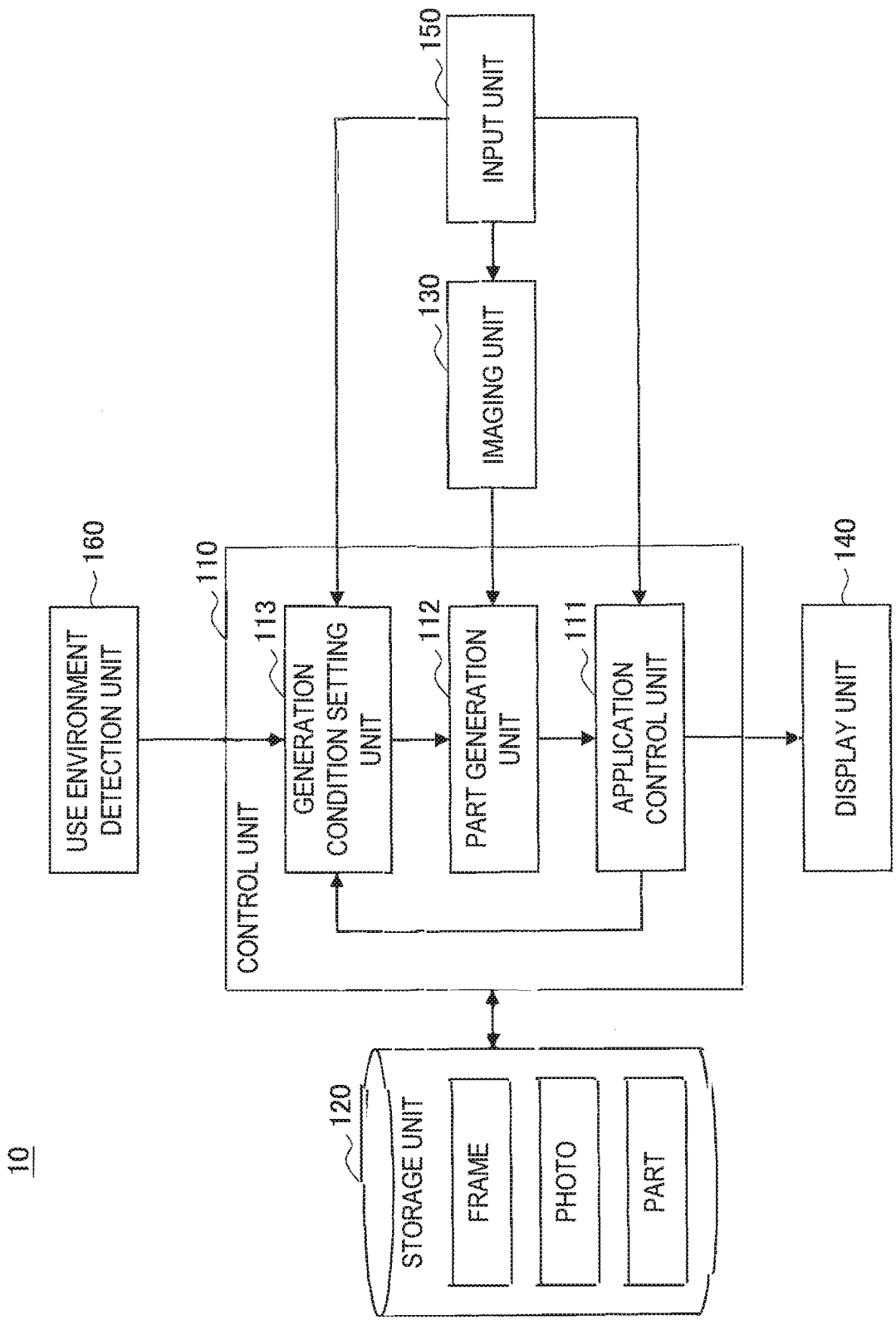
FIG. 2 is a functional block diagram showing an example of the configuration of an information processing apparatus according to the embodiment of the present disclosure.

The functions and configurations of the information processing apparatus 10 according to the embodiment of the present disclosure will be described with reference to FIG. 2. FIG. 2 is a functional block diagram showing an example of the configuration of the information processing apparatus 10 according to the embodiment of the present disclosure.

Also, a case in which an application executed by the information processing apparatus 10 is an instant messenger exchanging various kinds of information in real time between a plurality of users via a network will be exemplified in the following description. In the instant messenger, text information such as messages and image information such as photos or images are transmitted and received between users and the transmitted and received information is arranged and displayed in a chronological order on a display screen. In the following description, a line in which exchanges of various kinds of information are arranged between the plurality of users in chronological order and are displayed on the display screen is referred to as a timeline. The timeline can be displayed in a scrolling manner in a chronological direction on the display screen and past exchange between the users can be referred to. Also, the following description will be made exemplifying a stamp that has a display including a portion of any photo as the part used in the application and a background image displayed as a background at the time of execution of the application. Here, the stamp refers to a part in which a predetermined frame is attached to any photo and which is attachable to any position on the display screen during the execution of the application. In the instant messenger, the stamp can be transmitted and received instead of a message or together with a message and the transmitted and received stamp is displayed on a timeline. Thus, in the instant messenger, display of the stamp can be said to be simple display of a photo. Also, the background image refers to a part that is displayed as a background on a display screen during execution of an application. In the instant messenger, the background image can be displayed as a background of the display of the timeline.

Referring to FIG. 2, the information processing apparatus 10 according to the present embodiment includes a control unit 110, a storage unit 120, an imaging unit 130, a display unit 140, an input unit 150, and a use environment detection unit 160.

The control unit 110 integrally controls the information processing apparatus 10 and performs various kinds of information processing regarding control of execution of a predetermined application and generation of a part to be used by the application. The function and the configuration of the control unit 110 will be described in more detail. The control unit 110 includes an application control unit 111, a part generation unit 112, and a generation condition setting unit 113.

The application control unit 111 controls the execution of the predetermined application and at least displays a part generated by the part generation unit 112 on a display screen during the execution of the application. Specifically, the application control unit 111 executes the predetermined application installed in the information processing apparatus 10 by transmitting and receiving various kinds of information to and from the application management server 20 shown in FIG. 1. For example, the application control unit 111 activates the instant messenger and displays transmission and reception of messages or the like between designated specific users in the format of a timeline on a display screen of the display unit 140 while referring to account information or the like of the users managed by the application management server 20. Also, the application control unit 111 displays the part generated by the part generation unit 112 together with the timeline on the display screen of the display unit 140.

When the part generated by the part generation unit 112 is a stamp, the application control unit 111 superimposes the stamp transmitted and received between the users on the timeline and displays the stamp on the display screen. Also, the application control unit 111 can superimpose and display the stamp at any position on the timeline. For example, the application control unit 111 may display the stamp at a position according to a transmission or reception time of the stamp on the timeline or may trace back the timeline and display the stamp in regard to the exchange of a past message. Also, the application control unit 111 may adjust the size or angle (rotational angle) of the stamp in any manner and display the adjusted stamp on the timeline. The position, the size, the angle, and the like of the stamp displayed by the application control unit 111 may be designated appropriately by the user.

Also, when the part generated by the part generation unit 112 is a background image, the application control unit 111 displays the background image as a background of the timeline on the display screen. The background image displayed as the background of the timeline on the display screen may be selected in any manner by the user. Here, a predetermined image may be constantly displayed as the background image regardless of scroll display of the timeline or the background image may also be scrolled according to the scroll display of the timeline. When the background image is scroll-displayed, one background image may be repeatedly scroll-displayed or a plurality of mutually different background images may be continuously scroll-displayed. Further, when the plurality of background images are continuously scroll-displayed, a gap between the background images may be set according to content such as a message, a photo, a stamp, or the like on the timeline. Also, for example, when the exchange of information between the users is paused once and updating of the timeline resumes after a predetermined time, the application control unit 111 may switch and display the background image. Also, when a photo or a stamp is transmitted and received on the timeline, the application control unit 111 may display a background image generated from the transmitted and received photo or a photo included in the transmitted and received stamp as a background after a transmission and reception timing of the photo or the stamp on the timeline. Also, according to a transmitted and received message, the application control unit 111 may display a background image generated from a photo associated with content of the message as a background after a transmission and reception timing of the message on the timeline.

Also, the application control unit 111 may associate the part displayed on the display screen with the original photo data included in the part and perform an operation of an application. For example, when a stamp displayed on the display screen is selected, the application control unit 111 may switch the display of the display screen to display of a photo included in the stamp or may display a photo included in the stamp and another photo (for example, a photo or the like in which the same person is shown) associated with the photo on the display screen like a photo album. Conversely, when any photo data is selected by a user, the application control unit 111 may display a list of parts which are parts in a predetermined application and are generated from the selected photo data.

Also, in the present embodiment, a part is generated from any photo data owned by a user, as will be described later in the description of the function of the part generation unit 112. Accordingly, the part according to the present embodiment can be said to have a specific personal property of the user. The application control unit 111 can control various applications based on the personal property of such a part. For example, the application control unit 111 may use the part according the present embodiment as a code having a link function to predetermined information. Specifically, when an application controlled by the application control unit 111 is a code reader that reads a 2-dimensional code such as a bar code or a QR code (registered trademark) and extracts predetermined information, the application control unit 111 may execute the application so that information associated with a photo included in the part is extracted by reading the part according to the present embodiment displayed on the display screen (or printed on a paper medium). Also, for example, the application control unit 111 may superimpose functions similar to a public key function and a private key function for authenticating access to a predetermined area on the part according to the present embodiment. Specifically, when an application controlled by the application control unit 111 is an application performing an access authentication process to a predetermined area, the application control unit 111 may execute the application so that access to the predetermined area is authenticated, for example, under the condition that a specific part is owned or information regarding a photo included in the specific part is known. In this way, the application control unit 111 can apply the part according to the present embodiment to diverse applications.

The part generation unit 112 generates a part that is suitable for a predetermined application and that includes at least a portion of any photo and is displayed on the display screen by the application. Also, the part generation unit 112 stores the generated part in a storage area which is under management of an application executed by the application control unit 111. Here, photo data used to generate the part may be any photo data owned by the user. The function of the part generation unit 112 will be described in more detail giving an example of the above-described stamp and background image.

First, a case in which the part generated by the part generation unit 112 is the stamp will be described. The stamp includes a photo and a frame. A photo used for the part generation unit 112 to generate the stamp may be any photo and may be a photo taken or acquired in advance and stored in the storage unit 120. Also, the photo may be a photo taken in real time by the imaging unit 130 for the purpose of generating the stamp.

The frame is a decoration that is fringed around a photo in the stamp or is superimposed on a photo. In the present embodiment, the frame can have any shape. For example, the frame according to the present embodiment has any shape such as a polygonal shape (a triangular shape, a rectangular shape, or the like), a circular shape, a star shape, a heart shape, a teardrop shape, or a cloud shape. Also, the shape of the frame is not limited to an abstract shape, but may be a shape representing a specific object such as a flower, an umbrella, the sun, or the like. When the frame has a shape such as O or x, message characteristics such as "correct (good)" or "incorrect (bad)" can be superimposed on the stamp. Also, when the frame itself contains text information such as "Thank you," "Sorry," or "OK" and the text is superimposed on a photo, the feelings or intention of the user may be superimposed on the stamp.

The part generation unit 112 generates the stamp by combining the selected frame and photo. For example, the part generation unit 112 generates the stamp by trimming the circumference of a photo according to the shape of the selected frame. At this time, for example, when a photo contains a person, the part generation unit 112 may adjust the position or size of the photo inside the frame and then perform the trimming so that the person is located at the center of the frame or at a predetermined position in the frame (for example, when the frame is a frame patterning the shape of glasses, eyes of the person in the photo are located at the positions of lenses of the glasses). Also, upon generating the stamp, the part generation unit 112 may appropriately adjust a resolution, luminance, white balance, or the like of the photo. The resolution, luminance, white balance, or the like of the photo may be adjusted according to a preset condition or may be set according to the selected frame. For example, when a frame representing a sad feeling, such as a frame patterning the shape of a tear, or a frame associated with rain, such as a frame patterning the shape of a cloud, is selected, the part generation unit 112 may decrease the luminance to darken an image. Conversely, when a frame representing a joyous feeling is selected, the part generation unit 112 may increase the luminance to radiate the image.

Next, a case in which the part generated by the part generation unit 112 is the background image will be described. The background image is generated from any photo. The photo used for the part generation unit 112 to generate the background image may be any photo and may be a photo taken or acquired in advance and stored in the storage unit 120. Also, the photo may be a photo taken in real time by the imaging unit 130 for the purpose of generating a background image.

For example, the background image according to the present embodiment is displayed as a background of the timeline of the instant messenger. Accordingly, the part generation unit 112 appropriately adjusts the resolution, luminance, or the like of the photo and generates the background image so that the background image does not interfere with display of text information, image information, and the like of the timeline. Also, the part generation unit 112 may generate a plurality of mutually different background images from a plurality of mutually different photos.

The generation condition setting unit 113 sets a generation condition of the part generated by the part generation unit 112. For example, when the part is the stamp, the generation condition setting unit 113 sets a selection condition of the photo and the frame for generating the stamp. Also, for example, when the part is the background image, the generation condition setting unit 113 sets a selection condition of a photo for generating the background image. Here, the generation condition setting unit 113 can set the generation condition based on at least one of an operation input by the user, use environment information indicating an execution status of the application, and various kinds of information (display information) displayed on the display screen during the execution of the application by the application control unit 111. Hereinafter, the generation condition of the part set by the generation condition setting unit 113 will be specifically described.

When the part is the stamp, the generation condition setting unit 113 may set the generation condition so that the photo and the frame for generating the stamp are selected manually by the user. In the case of this generation condition, when the user selects the photo and the frame, the part generation unit 112 generates the stamp based on the selected photo and frame. Also, in this case, for example, the photo and the frame may be selected by the user in any manner from the photos and the frames stored in the storage unit 120, or the frame may be first selected by the user and the photo may be subsequently taken by the imaging unit 130 according to the frame. Specifically, the selected frame is displayed on a finder (for example, the display screen of the display unit 140) when the imaging unit 130 takes the photo. Therefore, the user can take the photo while appropriately adjusting the position, size, or the like of a photographing target within the finder so as to be suitable for the frame. Since a form in which the photo taken in this way is combined with the frame is displayed already on the finder at the time of the photography, the user can take a photograph while anticipating a completed drawing of the stamp generated by the part generation unit 112. Therefore, the stamp can be generated in greater accordance to the user's intentions.

Also, when the part is the stamp, the generation condition setting unit 113 may set the generation condition so that the part generation unit 112 can extract a photo suitable for a predetermined condition from, for example, the photos stored in the storage unit 120 and automatically generate the stamp from the selected photo. In the case of this generation condition, for example, the frame is set in advance and the part generation unit 112 generates the stamp by combining the extracted photo with the frame. Specifically, an extraction condition of the photo may be set according to a thing (a person or the like) included in the photo, a date on which the photo is taken, a location in which the photo is taken, or the like. Also, a photo in which a specific person is shown or a photo in which a person having a specific expression on his or her face is shown may be extracted. Further, the part generation unit 112 may have various functions of determining the above-described extraction condition of the photo. For example, the part generation unit 112 may have a function of recognizing a face, an expression, or the like of a person included in the photo or may have a function of acquiring information such as a photography date or a photography location from metadata such as Exchangeable Image File Format (Exif) information subordinate to photo data.

Also, when the part is the stamp, the generation condition setting unit 113 may set the generation condition so that at least one of the photo and the frame for generating the stamp is selected based on use environment information indicating a use status of the application. In this generation condition, the part generation unit 112 selects at least one of the photo and the frame based on the use environment information and generates the stamp based on the selected photo and/or the frame. Here, in the present embodiment, the use environment information includes all kinds of information when the information indicates a use status of the application. For example, the use environment information includes various kinds of information indicating an external environment of the information processing apparatus 10. For example, the use environment information may be positional information regarding the current position of the information processing apparatus 10. Also, the use environment information may be information regarding weather in the surrounding region including the current location during of the execution of the application by the information processing apparatus 10. Also, the use environment information may be temporal information regarding the current time. Also, the use environment information can be detected by the use environment detection unit 160.

The generation condition setting unit 113 may set the generation condition of the part so that the part generation unit 112 automatically selects the frame according to weather, for example, selects a frame patterning the shape of an umbrella or the shape of a cloud when the weather is rainy, and selects a frame patterning the sun when the weather is clear, based on information regarding weather included in the use environment information, and generates the stamp. Also, the generation condition setting unit 113 may set the generation condition of the part so that the part generation unit 112 automatically selects the frame according to the current location, for example, selects a frame with a shape patterning a famous product of a tourist attraction when the current location is the tourist attraction based on positional information regarding the current position included in the use environment information, and generates the stamp. Also, the generation condition setting unit 113 may set the generation condition of the part so that the part generation unit 112 automatically selects the frame according to a current time, for example, selects a frame giving a bright impression when the current time is daytime, or selects a frame giving a dark impression when the current time is nighttime, based on temporal information regarding the current time included in the use environment information, and generates the stamp.

Also, when the part is the stamp, the generation condition setting unit 113 may set the generation condition of the part so that the part generation unit 112 generates the stamp based on display information displayed on the display screen during the execution of the application. Examples of the display information include letter information such as messages transmitted and received during the execution of the application and image information such as photos and stamps. Specifically, the generation condition setting unit 113 may set the generation condition of the part so that the part generation unit 112 automatically selects a photo according to a conversation topic in the timeline, for example, selects a photo (for example, a photo associated with a person, a location, an event, or the like mentioned in the conversation topic) associated with transmitted and received messages or photos based on information regarding the transmitted and received messages or photos included in the display information, and generates the stamp. Also, such display information may be frequently transmitted from the application control unit 111 to the generation condition setting unit 113 during the execution of the application.

On the other hand, when the part is the background image, the generation condition setting unit 113 may set the generation condition so that a photo for generating the background image is selected manually by the user. In the case of this generation condition, when the user selects a photo, the part generation unit 112 generates the background image based on the selected photo. Also, in this case, the background image may be generated from the photo selected from the photos stored in the storage unit 120 or the background image may be generated in real time from a photo taken by the imaging unit 130.

Also, when the part is the background image, the generation condition setting unit 113 may set the generation condition so that the part generation unit 112 extracts a photo suitable for a predetermined condition from, for example, the photos stored in the storage unit 120 and automatically generates the background image from the selected photo. In the case of this generation condition, for example, the plurality of background images may be generated automatically by the part generation unit 112 from the plurality of extracted photos. Specifically, an extraction condition of the photo may be a thing (a person or the like) included in the photo, a date on which the photo is taken, a location in which the photo is taken, or the like. Also, a photo in which a specific person is shown or a photo in which a person having a specific expression on his or her face is shown may be extracted. Further, the part generation unit 112 may have various functions of determining the above-described extraction condition of the photo. For example, the part generation unit 112 may have a function of recognizing a face, an expression, or the like of a person included in the photo or may have a function of acquiring information such as a photography date or a photography location from metadata such as Exif information subordinate to photo data.

Also, when the part is the background image, the generation condition setting unit 113 may set the generation condition so that the photo for generating the background image is selected based on use environment information indicating a use status of the application. In this generation condition, the part generation unit 112 selects the photo based on the use environment information and generates the background image based on the selected photo. Here, in the present embodiment, the use environment information includes all kinds of information when the information indicates a use status of the application. For example, the use environment information includes various kinds of information indicating an external environment of the information processing apparatus 10. For example, the use environment information may be positional information regarding the current position of the information processing apparatus 10. Also, the use environment information may be information regarding weather in the surrounding region including the current location during of the execution of the application by the information processing apparatus 10. Also, the use environment information may be temporal information regarding the current time. Also, the use environment information can be detected by the use environment detection unit 160.

For example, the generation condition setting unit 113 may set the generation condition of the part so that the part generation unit 112 automatically selects the photo according to weather, for example, selects a photo in which a form of rain photographed previously is drawn when the weather is rainy, and selects a photo in which a form of clear weather is previously drawn when the weather is clear, based on information regarding weather included in the use environment information, and generates the background image. Also, the generation condition setting unit 113 may set the generation condition of the part so that the part generation unit 112 automatically selects the photo according to the current location, for example, selects a photo taken previously in a tourist attraction when the current location is the tourist attraction based on positional information regarding the current position included in the use environment information, and generates the background image. Also, the generation condition setting unit 113 may set the generation condition of the part so that the part generation unit 112 automatically selects the photo according to the current time, for example, selects a photo taken during the day when the current time is daytime, or selects a photo taken at night when the current time is nighttime, based on temporal information regarding the current time included in the use environment information, and generates the background image.

Also, when the part is the background image, the generation condition setting unit 113 may set the generation condition of the part so that the part generation unit 112 generates the background image based on display information displayed on the display screen during the execution of the application. Specifically, the generation condition setting unit 113 may set the generation condition of the part so that the part generation unit 112 automatically selects a photo according to a conversation topic in the timeline, for example, selects a photo (for example, a photo associated with a person, a location, an event, or the like mentioned in the conversation topic) associated with information regarding the transmitted and received messages or photos in the timeline, and generates the background image. Also, such display information may be frequently transmitted from the application control unit 111 to the generation condition setting unit 113 during the execution of the application.

The functions and the configurations of the application control unit 111, the part generation unit 112, and the generation condition setting unit 113 according to the present embodiment have been described above and the part generating and using process according to the present embodiment has been described. Also, the part generating and using process according to the present embodiment will be described more specifically in the following <3. Specific example of part generating and using process> while showing a display example of the display screen of the display unit 140.

Next, another configuration of the information processing apparatus 10 will be described with reference to FIG. 2.

The storage unit 120 is an example of a storage part that stores various kinds of information processed by the information processing apparatus 10. In the present embodiment, the storage unit 120 can store various kinds of information used in the part generating and using process performed by the control unit 110 or a process result. For example, the storage unit 120 stores information regarding the photo, the frame, or the like for generating the part. Also, the storage unit 120 may store information regarding the part generated by the part generation unit 112. Also, the information regarding the photo, the frame, or the like stored in the storage unit 120 may be appropriately updated by newly acquiring information regarding a photo or a frame through communication with another external apparatus via the network 30 or newly photographing a photo by the imaging unit 130. Also, the part stored in the storage unit 120 is not limited to the part generated by the part generation unit 112, but a part used by another user during the execution of the application may also be stored in the storage unit 120. Also, the storage area in which the information regarding the part in the storage unit 120 is stored may be a storage area (that is, a storage area which can be easily accessed by the application) managed under the application corresponding to the part. The part according to the present embodiment is suitable for the predetermined application, the part can be stored in the storage area corresponding to the application.

The imaging unit 130 is an example of an imaging part that photographs a photographing target in the format of a moving image or a still image. In the present embodiment, the imaging unit 130 includes a camera that takes a photo of a photographing target. The imaging unit 130 stores photo data of the taken photo in the storage unit 120. Also, in the present embodiment, as described above, the part (stamp)

can be generated in real time by displaying the frame on the finder of the imaging unit 130 and taking a photo.

The display unit 140 is an example of an output part that visually outputs various kinds of information in all of the formats of text, a graph, an image, and the like to the user. The display unit 140 includes, for example, a display device and outputs various kinds of information to the user by displaying the information on a display screen of the display device. In the present embodiment, driving of the display unit 140 is controlled by the application control unit 111 and information regarding an application executed by the application control unit 111 is displayed on the display screen. For example, when the application executed by the application control unit 111 is an instant messenger, the display unit 140 displays a message or a photo (that is, a timeline) transmitted and received by a user, a part that is suitable for the instant messenger, a message field for inputting the transmitted and received message, and the like on the display screen. Also, when the imaging unit 130 takes a photo, the display screen of the display unit 140 may also function as a finder.

The input unit 150 is an operation part that is operated by a user and is an example of an operation unit with which various kinds of information, an instruction regarding a process, and the like are input to the information processing apparatus 10. The input unit 150 includes, for example, an operation part such as a mouse, a keyboard, a touch panel, a button, or a switch. In the present embodiment, an operation of an application by the application control unit 111 may be controlled according to information, an instruction, or the like input from the input unit 150. Also, the setting of the generation condition of the part by the generation condition setting unit 113 may be controlled according to information, an instruction, or the like input from the input unit 150. Also, a process of taking a photo by the imaging unit 130 may be controlled via the input unit 150. Also, when the information processing apparatus 10 is a smartphone or a tablet PC, the display unit 140 and the input unit 150 may be integrated to form a touch panel.

The use environment detection unit 160 is an example of a detection part that detects the use environment information indicating a use status of an application. The use environment detection unit 160 includes, for example, various sensors. For example, the use environment detection unit 160 may include a position measurement device such as a Global Positioning System (GPS) sensor device and acquire positional information of the current position of the information processing apparatus 10 as the use environment information. Also, for example, the use environment detection unit 160 may acquire information regarding weather at the current position of the information processing apparatus 10 as the use environment information based on the acquired information regarding the current position by communicating with an external information providing server or the like. Also, for example, the use environment detection unit 160 may acquire temporal information regarding the current time as the use environment information. The use environment information acquired by the use environment detection unit 160 is used to set the generation condition of the part by the generation condition setting unit 113.

The examples of the functions of the information processing apparatus 10 according to the present embodiment have been described above with reference to FIG. 2. Each of the foregoing constituent elements may be configured using a general-purpose member or circuit or may be configured by hardware specialized for the function of each constituent element. Also, a CPU or the like may have all of the functions of the constituent elements. Accordingly, the configuration to be used may be modified appropriately according to a technical level, for example, when the present embodiment is realized.

According to the present embodiment, as described above, the part generation unit 112 generates the part that is suitable for the predetermined application and that includes at least a portion of any photo and is displayed on the display screen by the application. Then, the application control unit 111 displays the part generated by the part generation unit 112 on the display screen during the execution of the application. Thus, in the present embodiment, the user can use the photo in the application more simply by using the photo as one part of the application. Accordingly, the convenience of the user at the time of the use of the application is improved. Also, in the present embodiment, the generation condition setting unit 113 appropriately sets the generation condition of the part. Since the part desired by the user is generated by setting the generation condition according to the intention of the user, the convenience of the user at the time of the use of the part is further improved.

Specifically, when the application is an instant messenger and photo data is attempted to be delivered to a partner in the general instant messenger, the instant messenger and the photo data are not linked, that is, the photo data is not information under the management of the instant messenger. Accordingly, when the photo data is transmitted and received, it is necessary for the user to go through the trouble of designating the storage area in which the photo data desired by the user is stored or changing the data size or the format of the photo data to a format appropriate for the transmission and reception depending on the data size or data format of the photo data. Therefore, there is a probability of smooth communication being interrupted. On the other hand, in the present embodiment, by processing the photo data to the part suitable for the instant messenger, the photo data can be used as one part of the instant messenger. Since the part is suitable for a predetermined application, the part is stored in a predetermined storage area easily accessed by the application, under the management of the application. Also, when the part is generated from the photo data, the data size or the data format is changed to a format suitable for use in the application. Accordingly, in the part generating and using process according to the present embodiment, the generated part, that is, the photo data, can be used more simply in the application, thereby improving the convenience of the user.

Also, the configuration of the information processing apparatus 10 according to the present embodiment is not limited to the configuration shown in FIG. 2. The information processing apparatus 10 may further have a known configuration of an information processing apparatus such as a general PC or smartphone in addition to the configuration shown in FIG. 2. For example, the information processing apparatus 10 may include a communication unit that is connected to the network 30 shown in FIG. 1 and transmits and receives various kinds of information to and from another information processing apparatus 10 or the application management server 20. The information processing apparatus 10 can control execution of an application by transmitting and receiving various kinds of information to and from the application management server 20 via the communication unit. Also, in the present embodiment, it is not necessary for one apparatus to perform all of the processes performed by the information processing apparatus 10, but the constituent elements of the information processing apparatus 10 shown in FIG. 2 may be separated into a plurality of different apparatuses. Thus, in the present embodiment, the configurations of the part generating and using system 1 and the information processing apparatus 10 realizing the part generating and using process are not limited to the examples shown in FIGS. 1 and 2, but the part generating and using system 1 and the information processing apparatus 10 may have any configuration as long as it performs the above-described part generating and using process.

Also, the configurations of the part generating and using system 1 and the information processing apparatus 10 have been described exemplifying the case in which the application is the instant messenger and the part is the stamp or the background image used in the instant messenger, but the present embodiment is not limited to this example. For example, the application may be various types of mail software and the part may be a pictograph used in the mail software. When the part is a pictograph used in the mail software, the part generation unit 112 can generate a pictograph including at least a portion of a photo by selecting the photo or a decoration of the photo, or the like according to the generation condition set by the generation condition setting unit 113. The application control unit 111 can superimpose the generated pictograph on a message and transmit and receive the pictograph as mail. Also, for example, the application may be any of various types of online games and the part may be an image representing a face of an avatar or the like used in the online game. When the part is an image representing a face of an avatar or the like used in the online game, the part generation unit 112 can generate a facial image of the avatar including at least a portion of a photo by selecting the photo, a decoration of the photo, or the like according to the generation condition set by the generation condition setting unit 113. The application control unit 111 can reflect the generated facial image in a graphic of the face of a character in the game.

Figure 3:
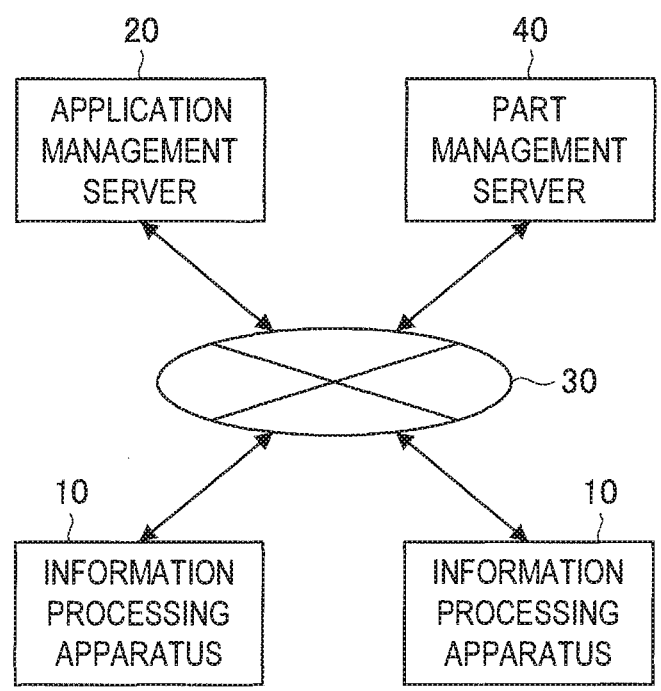
FIG. 3 is a functional block diagram showing an example of the configuration of a part generating and using system according to a modification example of the present embodiment.

Also, in the embodiment shown in FIGS. 1 and 2, the case in which the part generated by the part generation unit 112 is stored in the storage unit 120 of the information processing apparatus 10 has been described, but the present embodiment is not limited to this example. For example, the part generating and using system according to the present embodiment may be configured such that a server storing and managing the generated part is installed on a network (that is, on a cloud) which can be accessed from the plurality of information processing apparatuses 10 and the part can be shared between the plurality of users. An example of the configuration of the part generating and using system according to the present embodiment is shown in FIG. 3. FIG. 3 is a functional block diagram showing an example of the configuration of the part generating and using system according to a modification example of the present embodiment.

Referring to FIG. 3, a part generating and using system 2 according to the modification example of the present embodiment is configured such that information processing apparatuses 10, an application management server 20, and a part management server 40 are connected to communicate with each other via a network 30. Here, since the functions and the configurations of the information processing apparatus 10 and the application management server 20 in the part generating and using system 2 are the same as the functions and the configurations of the information processing apparatus 10 and the application management server 20 shown in FIGS. 1 and 2, the detailed description thereof will be omitted.

The part management server 40 is an information processing apparatus that stores and manages the part generated by the information processing apparatus 10. The part stored in the part management server 40 can be frequently updated according to the generation of the part by the information processing apparatus 10 and can be shared between specific users (for example, users permitted to access the part management server 40). That is, the user permitted to access the part management server 40 can use the part stored in the part management server 40 while accessing the part management server 40 during execution of an application in the information processing apparatus 10 of the user. Also, the part management server 40 can link the part to an application corresponding to the part and can store and manage the part so that the part can be smoothly used in the application. Specifically, in the part management server 40, the part can be stored in a storage area (that is, a storage area which can be easily accessed by the application) managed with the control of the application by the application control unit 111 of the information processing apparatus 10. Also, the part management server 40 can attach various priority orders to manage the parts. For example, when the parts are provided to a user, the part management server 40 can provide the parts in consideration of the priority orders, for example, by preferentially suggesting a frequently used part or a newly generated part to the user.

Also, the part generating and using system 2 according to the modification example of the present embodiment may be configured such that the part management server 40 manages the part and also generates the part. That is, the part generating and using system 2 may be configured such that the information processing apparatus 10 does not have the functions of the part generation unit 112 and the generation condition setting unit 113 but the part management server 40 has these functions. Further, when the part is a stamp, the part management server 40 may manage the frame in addition to the part. When the part generating and using system 2 is configured in this way, for example, data of a photo desired to be converted to a part by a user to the part management server 40 is transmitted so that the part management server 40 converts the photo to the part and the part management server 40 manages the generated part. The user can generate and use the desired part by accessing the part management server 40. When the part generating and using system 2 is configured in this way, a storage capacity of the storage unit 120 in the information processing apparatus 10 or loads of various processes in the control unit 110 can be reduced, thereby further simplifying the configuration of the information processing apparatus 10.

3. SPECIFIC EXAMPLES OF PART GENERATING AND USING PROCESS

Next, specific examples of the part generating and using process according to the present embodiment will be described with reference to FIGS. 4, 5, and 6A to 6C showing a display example of the display screen of the display unit 140. Hereinafter, a case in which the part is a stamp and a case in which the part is a background image will be described as the specific examples of the part according to the present embodiment.

[3-1. Case in Which Part is Stamp]

Figure 4:
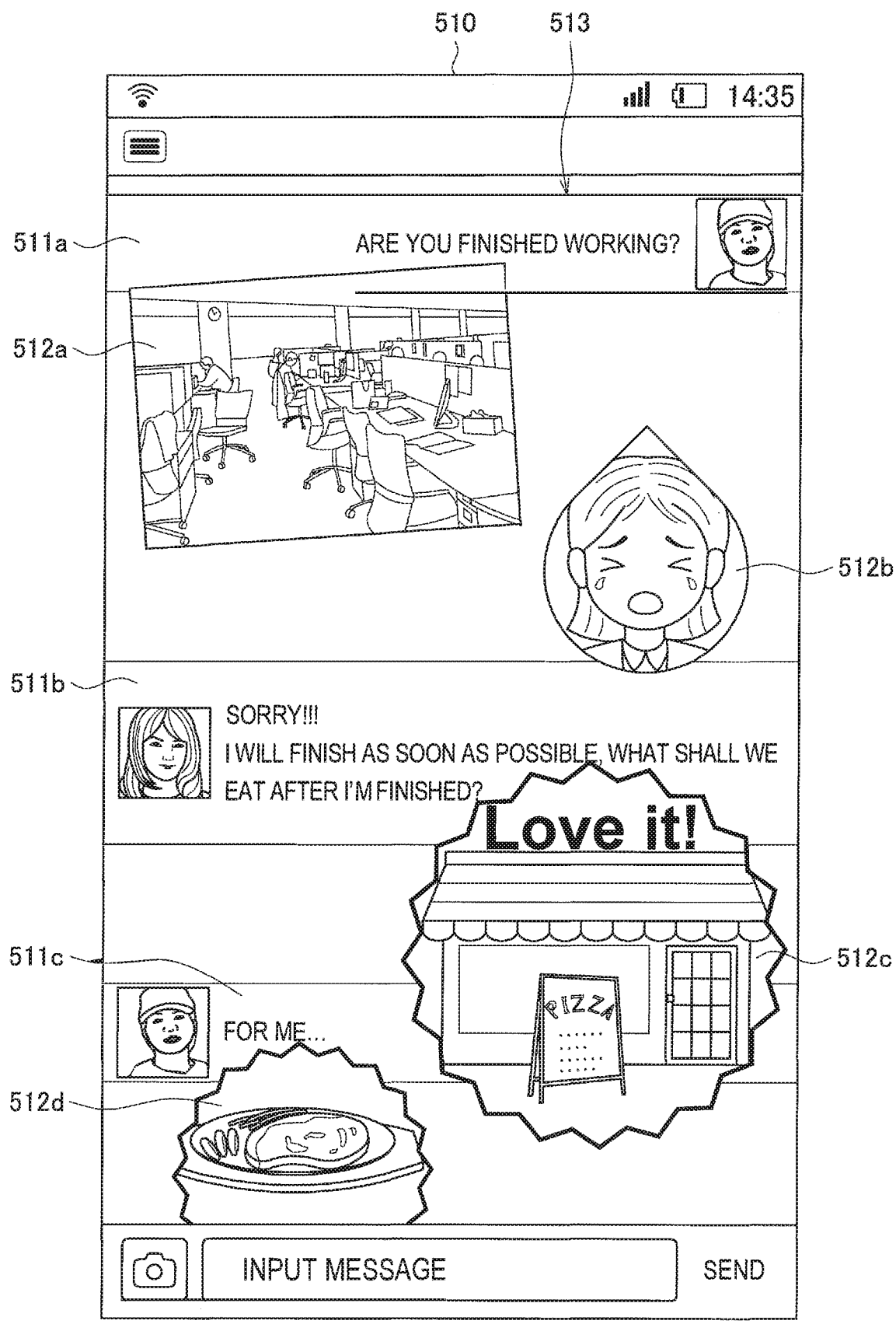
FIG. 4 is a schematic diagram showing an example of a display screen in a part generating and using process according to the present embodiment when a part is a stamp.

First, the part generating and using process in the case in which the part is a stamp will be described with reference to FIGS. 4 and 5. FIG. 4 is a schematic diagram showing an example of the display screen in the part generating and using process according to the present embodiment in the case in which the part is the stamp. FIG. 5 is an explanatory diagram for describing the configuration of the stamp according to the present embodiment.

Referring to FIG. 4, a timeline 513 is displayed on a display screen 510. Here, the display screen 510 corresponds to the display screen of the display unit 140 of the information processing apparatus 10 shown in FIG. 2. Also, the timeline 513 is a timeline arranged and displayed in chronological order in which messages, photos, stamps, or the like transmitted and received (posted) between users are posted in the instant messenger which is an example of the application executed by the information processing apparatus 10.

In the example shown in FIG. 4, the timeline 513 includes messages 511a to 511c and stamps 512a to 512d. Also, the timeline 513 is configured such that the messages 511a to 511c and the stamps 512a to 512d are displayed in chronological order from the top to the bottom of the display screen 510. Here, the stamps 512a to 512d are specific examples of the parts generated by the part generation unit 112 of the information processing apparatus 10 shown in FIG. 2 and used by the instant messenger which is an example of the application.

In the present embodiment, the users can mutually declare their intentions by posting the messages and the stamps during the execution of the application. For example, in the example shown in FIG. 4, the message 511a is transmitted from one user (for example, user A) to ask whether she has finished work and the stamp 512a generated from a photo obtained by photographing her office is transmitted. On the other hand, the stamp 512b generated from a photo obtained by photographing a crying face of the other user (for example, user B) is transmitted from the other user and the message 511b indicating that she has not finished work is posted. Thus, in the present embodiment, closer communication is realized between the users by posting not only the messages but also the stamps including the photos associated with the content of the messages.

Further, in the example shown in FIG. 4, the message 511c indicating suggestion of a meal is transmitted from the foregoing user B and the stamp 512c generated from a photo obtained by photographing the storefront of a pizza store is transmitted. Also, a frame on which the text "Love it!" showing "a favorite" of user B is superimposed is used in the stamp 512c. Accordingly, other users referring to the stamp 512c can know that user B wants to go to the pizza store shown in the stamp 512c. On the other hand, the stamp 512d generated from a photo obtained by photographing a steak is posted by the foregoing user A. Other users referring to the stamp 512d can know that user A wants to eat the steak. Thus, in the present embodiment, since the stamps containing the photos and the information pictured in the photos are exchanged between the users, communication can be performed only by posting the stamps.

Also, in the present embodiment, the positions at which the stamps 512a to 512d are superimposed and displayed on the timeline 513 can be adjusted appropriately by the user. Also, when the stamps 512a to 512d are superimposed and displayed on the timeline 513, the sizes, the angles (rotational angles), or the like of the stamps 512a to 512d can also be adjusted appropriately by the user. Accordingly, for example, the sizes or the angles of the stamps 512a to 512d can be adjusted so that the timeline 513 is traced back to superimpose and display the stamps 512a to 512d in regard to a previous conversation topic or a specific impression is given to the user receiving the stamps 512a to 512d.

Here, the configuration of the stamp according to the present embodiment will be described in detail with reference to FIG. 5. As described above in <2. Configuration of information processing apparatus>, the stamp according to the present embodiment includes a photo and a frame. In FIG. 5, the configuration of the stamp 512b shown in FIG. 4 is shown as an example of the stamp.

As shown in FIG. 5, when the stamp 512b is generated, a frame 514 with a teardrop shape and a photo 515 obtained by photographing a crying face are selected. The frame 514 and the photo 515 may be selected according to the setting of the generation condition by the generation condition setting unit 113 shown in FIG. 2, may be selected manually by the user, or may be automatically selected according to a predetermined condition. The part generation unit 112 generates a stamp by combining the selected frame 514 and photo 515. Specifically, in the example shown in FIG. 5, a stamp 512b is generated by trimming the photo 515 according to the shape of the frame 514. Also, although not explicitly shown in FIG. 5, when the stamp 512b is generated, other imaging processing may be performed appropriately by lowering the resolution of the photo 515 or adjusting the luminance, white balance, or the like of the photo 515.

The part generating and using process in the case in which the part is the stamp has been described above with reference to FIGS. 4 and 5. In the present embodiment, as described above, the user can transmit the stamp instead of transmitting the photo since the photo is changed to the part having the format suitable for the application. Accordingly, personal messages can be delivered more simply, for example, by generating a stamp from a self photo and transmitting the stamp. Accordingly, diverse methods of promoting communication between users can be realized, and thus convenience of the user is improved. Also, in the present embodiment, the timeline on which the stamp is superimposed can represent a history of the communication between users and can simultaneously serve as album content of a photo album or a picture diary. Accordingly, in the present embodiment, not only can an improvement of the convenience in communication between users be realized, but attractive album content can also be generated more simply.

[3-2. Case in Which Part is Background Image]

Figure 6A:
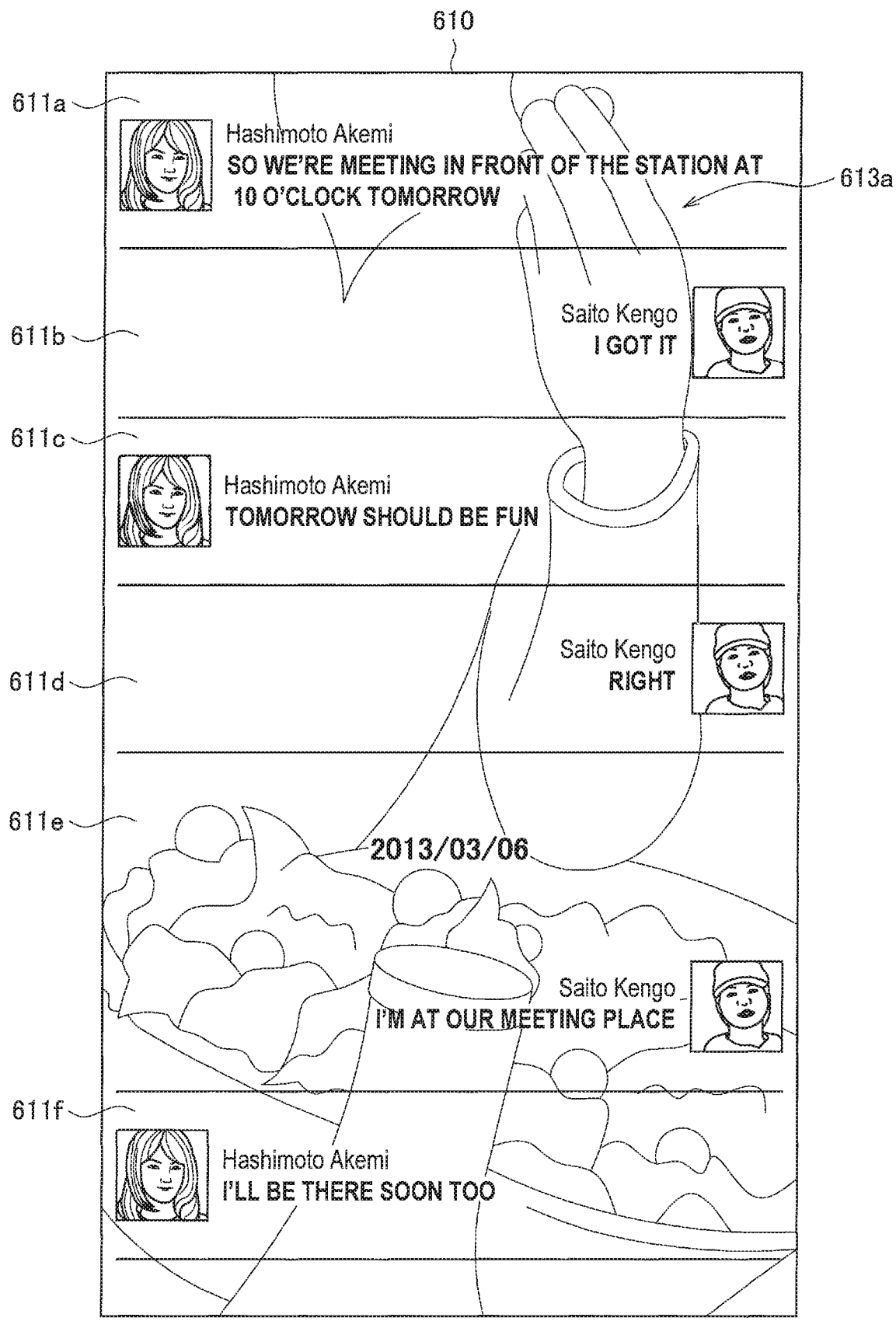
FIG. 6A is a schematic diagram showing an example of a display screen in the part generating and using process according to the present embodiment when the part is a background image.
Figure 6B:
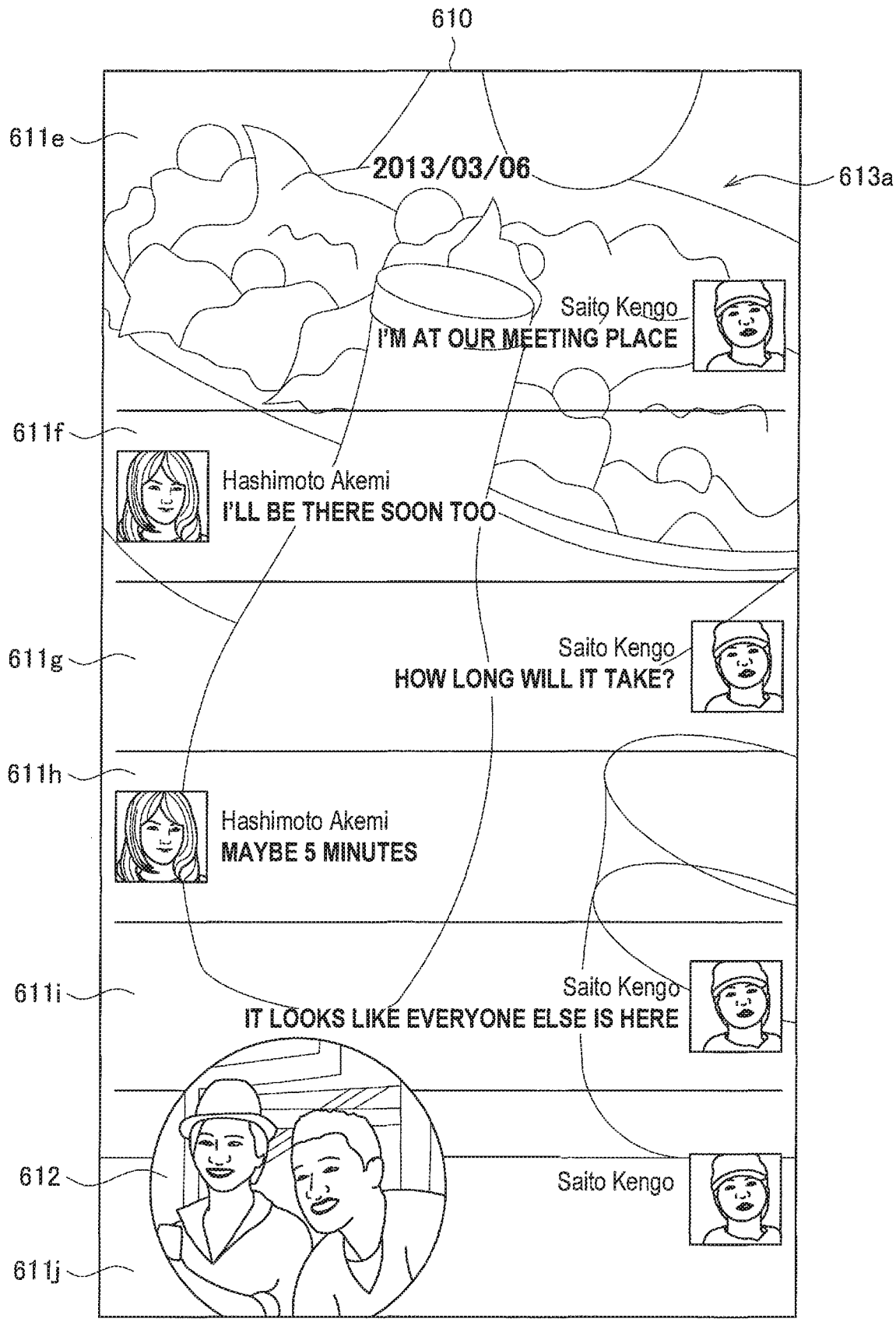
FIG. 6B is a schematic diagram showing an example of a display screen in the part generating and using process according to the present embodiment when the part is a background image.
Figure 6C:
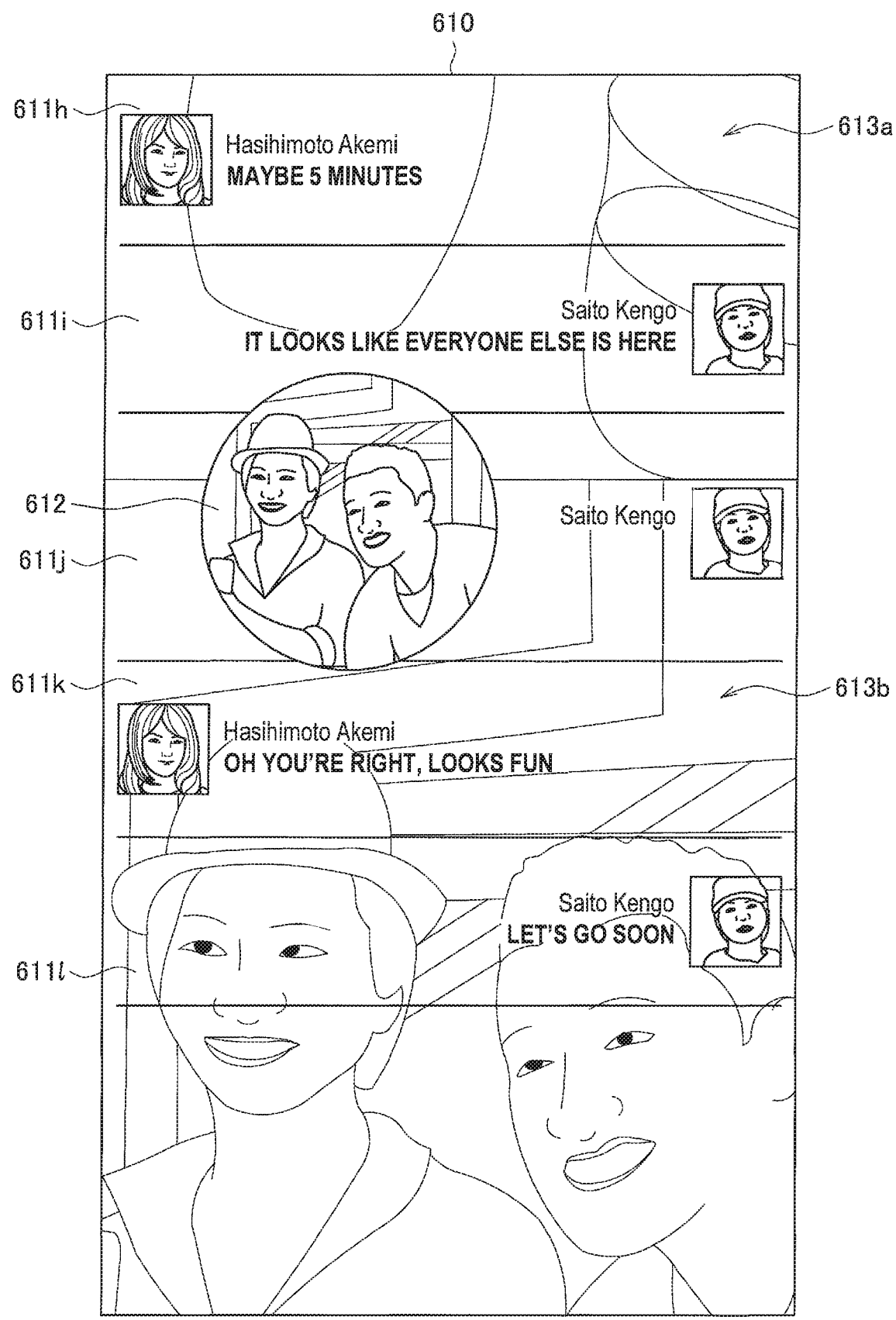
FIG. 6C is a schematic diagram showing an example of a display screen in the part generating and using process according to the present embodiment when the part is a background image.

Next, the part generating and using process in the case in which the part is a background image will be described with reference to FIGS. 6A to 6C. FIGS. 6A to 6C are schematic diagrams showing an example of display screen in the part generating and using process according to the present embodiment in the case in which the part is a background image.

Referring to FIGS. 6A to 6C, a timeline 610 displayed on the display screen is shown. Here, as in the timeline 513 shown in FIG. 4, the timeline 610 is a timeline arranged and displayed in chronological order in which messages, photos, or stamps posted between users are posted in the instant messenger which is an example of the application executed by the information processing apparatus 10. Also, for example, the timeline 610 is displayed on the display screen of the display unit 140 of the information processing apparatus 10 shown in FIG. 2. In the example shown in FIGS. 6A to 6C, messages and stamps can be arranged from the top to the bottom in the drawing in chronological order in the timeline 610. Also, FIGS. 6A, 6B, and 6C show a form in which the timeline 610 and the background image are changed in order when new messages and stamps are posted in the timeline 610.

First, referring to FIG. 6A, the timeline 610 includes messages 611a to 611f. Also, a background image 613a is displayed in the background of the timeline 610. Here, the background image 613a is a specific example of the part which is generated by the part generation unit 112 of the information processing apparatus 10 shown in FIG. 2 and is used in the instant messenger which is an example of the application. That is, the background image 613a is generated from a photo and is, for example, a photo in which one scene of a party is photographed in the example shown in FIG. 6A. The background image generated from the photo in which persons, food, beverages, and the like are photographed is shown.

Referring to FIG. 6B, a form in which new messages 611g to 611j are posted and the timeline 610 is updated from the state shown in FIG. 6A is shown. Also, in FIG. 6B, as the latest post of the timeline 610, a stamp 612 in which 2 persons are photographed is posted. Here, in the present embodiment, as shown in FIG. 6B, the timeline 610 is updated, that is, when the timeline 610 is scroll-displayed, the background image 613a may also be displayed scroll-displayed simultaneously. When the background image 613a is scroll-displayed together with the timeline 610, the degree (speed) of the scroll display of the background image 613a may be substantially the same as a speed of the scroll display of the timeline 610 or may be different from the speed of the scroll display of the timeline 610. By performing the display such that the speed of the scroll display of the background image 613a is different from the speed of the scroll display of the timeline 610, it is possible to produce a so-called parallax effect in which the display of the display screen causes users to sense depth. Such scroll display of the timeline 610 and the background image 613a is controlled by, for example, the application control unit 111 shown in FIG. 2.

FIG. 6C shows a form in which new messages 611k and 611l are further posted and the timeline 610 is further updated from the state shown in FIG. 6B. Also, in FIG. 6C, a form in which the background image 613a is also scroll-displayed with the update of the timeline 610 is shown, but another background image 613b is displayed on the lower side (that is, the chronological direction in the timeline 610) of the background image 613a. The background image 613b is a background image generated from a photo contained in the stamp 612, and the display of the background image 613a and the display of the background image 613b are switched using a position at which the stamp 612 is posted in the timeline 610 as a separation. Thus, in the present embodiment, a background image which is a part in the instant messenger may be newly generated based on display information such as a message, a photo, a stamp, or the like posted to the instant messenger and the generated background image may be displayed on the display screen. In the example of the configuration of the information processing apparatus 10 shown in FIG. 2, the information regarding the content of the stamp 612 posted to the timeline 610 is transmitted from the application control unit 111 to the generation condition setting unit 113, the generation condition of the part is set by the generation condition setting unit 113 based on the transmitted information regarding the stamp 612 so that the background image 613b is generated using the photo contained in the stamp 612, and the background image 613b is generated by the part generation unit 112 based on the set generation condition, thereby realizing the state shown in FIG. 6C. Also, a timing at which the background image is newly generated and a timing at which the generated background image is displayed on the display screen are not limited to the timing at which the stamp shown in FIG. 6C is posted. For example, a new background image may be generated or displayed based on the content of a posted message.

The part generating and using process in the case in which the part is the background image has been described above with reference to FIGS. 6A to 6C. In the present embodiment, as described above, the background image which is the part generated from the photo is displayed as the background during the execution of the application. Also, the background image can be a background image reflecting exchange of the information between the users in the application. Accordingly, communication between the users can be further promoted and the display itself according to the timeline and the background image can serve as album content, as in the case in which the part is the stamp. Accordingly, in the present embodiment, not only can an improvement of the convenience in communication between the users be realized, but attractive album content can also be generated more simply.

4. PROCESSING ORDER OF PART GENERATING AND USING METHOD

Next, a processing order of a part generating and using method according to the embodiment of the present disclosure will be described with reference to FIG. 7. FIG. 7 is a flowchart showing an example of the processing order of the part generating and using method according to the embodiment of the present disclosure. Also, in the following description of the processing order of the part generating and using method, a case in which the part generating and using method according to the present embodiment is realized with the configurations of the part generating and using systems 1 and 2 and the information processing apparatuses 10 shown in FIGS. 1,2, and 3 will be exemplified. Also, since the functions and the configurations of the constituent elements of the part generating and using systems 1 and 2 and the information processing apparatuses 10 are the same as those described above in the foregoing <1. Configuration of part generating and using system> and <2. Configuration of information processing apparatus>, the detailed description thereof will be omitted.

Referring to FIG. 7, in step S701, the generation condition of the part is first set by the generation condition setting unit 113. The generation condition of the part may be, for example, a condition indicating that portions included in a part such as a photo, a frame, or the like are selected manually by a user or may be a condition indicating that portions included in a part such as a photo, a frame, or the like are automatically extracted under a predetermined condition. Also, the generation condition of the part may be set based on the use environment information, the display information, or the like.

Subsequently, in step S703, the part is generated by the part generation unit 112 based on the generation condition set in step S701. The part is a part that is used in an application executed by the application control unit 111 and is suitable for the application. In the present embodiment, the part is a part that includes a portion of a photo and is displayed on the display screen during the execution of the application. Specifically, the part is, for example, a stamp or a background image displayed on the display screen during the execution of the application. Also, the photo used to generate the part may be a photo that is taken or acquired previously and is stored in the storage unit 120 or may be a photo that is taken in real time to generate the part. The part generated by the part generation unit 112 is stored in a storage area which can be managed by a corresponding application (that is, a storage area which is easily accessed by the application) in the storage unit 120 of the information processing apparatus 10. Alternatively, when the part management server 40 is separately installed as in the example of the configuration shown in FIG. 3, the part generated by the part generation unit 112 may be stored in the part management server 40 and may be managed to be sharable between a plurality of users.

Subsequently, in step S705, whether a predetermined input in the application is performed is determined by the application control unit 111. Here, the predetermined input in step S705 may be an input indicating use of the part. For example, the predetermined input is an input indicating posting of a stamp in the instant messenger or an input indicating setting of a background image. Also, the predetermined input may include an input of selecting a certain part to be used among a plurality of parts stored in the storage unit 120 and the part management server 40. For example, the application control unit 111 can determine whether the input indicating use of the part is performed according to an operation input of the user input from the input unit 150. When the predetermined input indicating the use of the part in the application is not performed in step S705, the process returns to step S701 and the setting of the generation condition of the part and the generation of the part are repeatedly performed so that the parts are sequentially generated and accumulated according to the generation condition. When the predetermined input indicating the use of the part in the application is performed in step S705, the process proceeds to step S707.

In step S707, the part is used in the application by the application control unit 111. Here, the use of the part in step S707 may be display of the part selected in step S705 on the display screen. Also, in step S707, the size, the position, or the like of the part displayed on the display screen may be adjusted through, for example, an operation input of a user via the input unit 150.

When the part is displayed on the display screen in step S707, the series of processes in the part generating and using method according to the present embodiment ends. In the present embodiment, however, the processes from step S701 to step S707 described above are repeatedly performed so that the generation, the storage, and the use of the part are frequently performed. Accordingly, the parts which can be used in the application by the user gradually increase, thereby improving the degree of freedom when the user uses the parts.

The processing order of the part generating and using method according to the embodiment of the present disclosure has been described above with reference to FIG. 7. Also, the flowchart shown in FIG. 7 is merely an example of the processing order of the part generating and using method according to the present embodiment and the present embodiment is not limited to this example. For example, the processing order of the part generating and using method according to the present embodiment may include various processes that can be performed in the part generating and using process according to the present embodiment described in the foregoing <1. Configuration of part generating and using system>, <2. Configuration of information processing apparatus>, and <3. Specific examples of part generating and using process> in addition to the processes shown in the steps of FIG. 7.

5. HARDWARE CONFIGURATION

Figure 8:
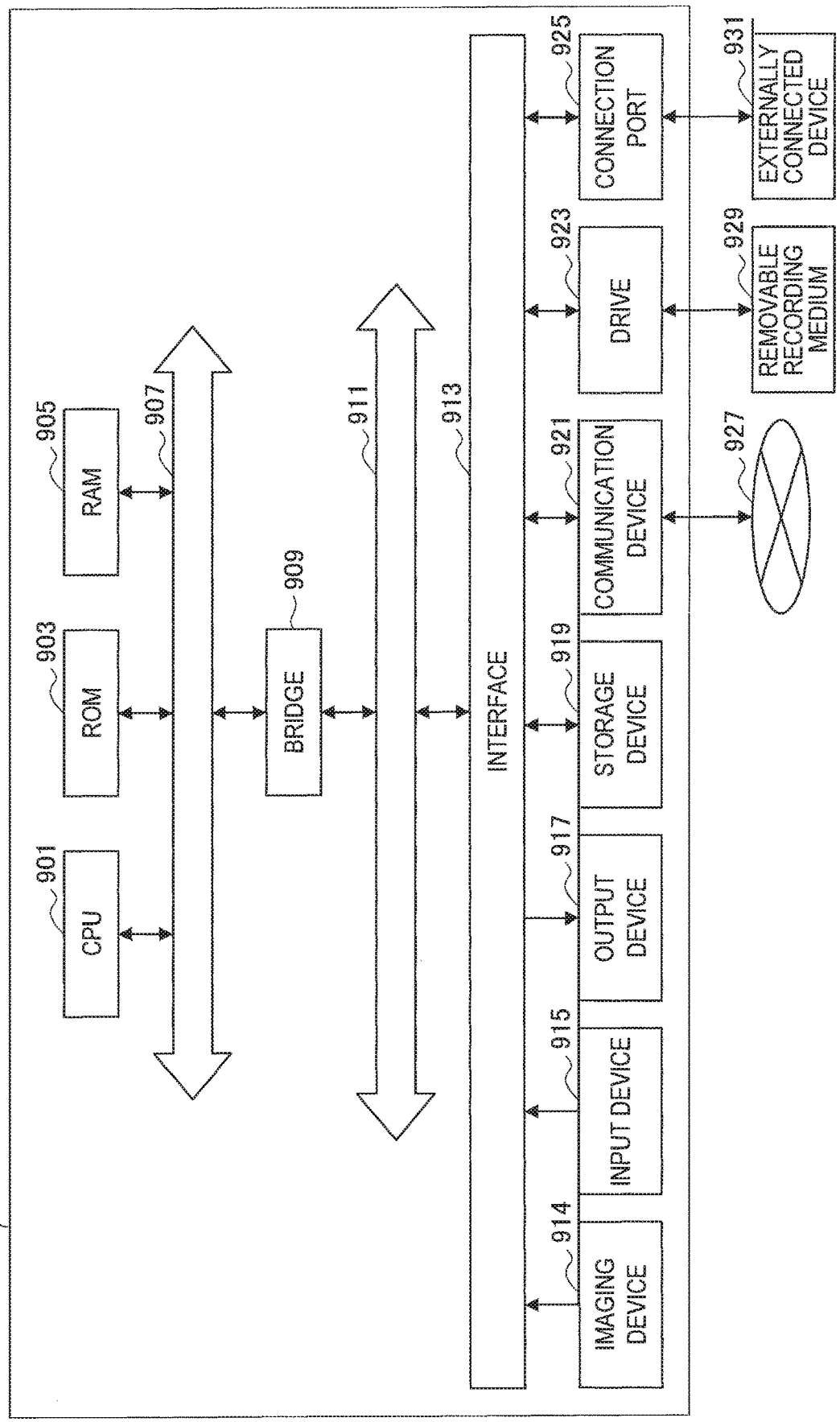
FIG. 8 is a functional block diagram showing a hardware configuration of the information processing apparatus according to the embodiment of the present disclosure.

Next, a hardware configuration of the information processing apparatus 10 according to an embodiment of the present disclosure will be described with reference to FIG. 8. FIG. 8 is a functional block diagram showing the hardware configuration of the information processing apparatus 10 according to the embodiment of the present disclosure.

The information processing apparatus 10 mainly includes a CPU 901, a ROM 903, and a RAM 905. In addition, the information processing apparatus 10 further includes a host bus 907, a bridge 909, an external bus 911, an interface 913, an imaging device 914, an input device 915, an output device 917, a storage device 919, a communication device 921, a drive 923, and a connection port 925.

The CPU 901 functions as an arithmetic operation processing device and a control device, and controls all or some of operations performed in the information processing apparatus 10 according to various kinds of programs recorded in the ROM 903, the RAM 905, the storage device 919, and a removable recording medium 929. The CPU 901 corresponds to, for example, the control unit 110 shown in FIG. 2 in the present embodiment, and performs processes on various kinds of information in the part generating and using process according to the present embodiment. The ROM 903 stores programs that the CPU 901 uses, arithmetic operation parameters, and the like. The RAM 905 primarily stores programs that the CPU 901 uses, parameters that appropriately change in execution of the programs, and the like. The CPU 901, the ROM 903, and the RAM 905 are connected to one another by the host bus 907 configured by an internal bus such as a CPU bus.

The host bus 907 is connected to the external bus 911 such as a PCI (Peripheral Component Interconnect/Interface) bus via the bridge 909. In addition, the imaging device 914, the input device 915, the output device 917, the storage device 919, the communication device 921, the drive 923, and the connection port 925 are connected to the external bus 911 via the interface 913.

The imaging device 914 is an imaging part such as a camera that photographs photographing targets in the form of a moving image or a still image. To be specific, the imaging device 914 has a plurality of light-sensing elements arrayed in a two-dimensional shape, can acquire image signals expressing images of photographing targets by performing photoelectric conversion using the light-sensing elements, and can generate still images and moving images of the photographing targets by performing various kinds of signal processes on the image signals. In the present embodiment, for example, the imaging device 914 corresponds to the imaging unit 130 shown in FIG. 2 and acquires a photo used to generate a part in the part generating and using process according to the present embodiment.

The input device 915 is an operation part which users operate, for example, a mouse, a keyboard, a touch panel, a button, a switch, a lever, and the like. In addition, the input device 915 may be, for example, a remote controlling part (so-called remote controller) that uses infrared rays or other radio waves, or may be externally connected device 931 such as a mobile telephone or a PDA corresponding to operations of the information processing apparatus 10. Furthermore, the input device 915 is configured as, for example, an input control circuit that generates input signals based on, for example, information input by a user using the operation part described above and outputs the signals to the CPU 901. A user of the information processing apparatus 10 can input various kinds of data or instruct the information processing apparatus 10 on processing operations by operating the input device 915. In the present embodiment, for example, the input device 915 corresponds to the input unit 150 shown in FIG. 2 and a user can input an instruction to perform an operation of an application executed in the information processing apparatus 10 or various instructions to generate a part through an operation input via the input unit 150.

The output device 917 is configured as a device that can inform users of acquired information in a visual or auditory manner. As such a device, there are display devices including a CRT display device, a liquid crystal display device, a plasma display device, an EL display device, and a lamp, audio output devices including a speaker, and a headphone, a printing device, a mobile phone, and the like. The output device 917 outputs, for example, results obtained from various kinds of processes performed by the information processing apparatus 10. To be specific, a display device displays results obtained from various kinds of processes performed by the information processing apparatus 10 in various forms of text, a graph, an image, and the like. In the present embodiment, for example, the display device corresponds to the display unit 140 shown in FIG. 2 and performs display indicating an operation of the application executed in the information processing apparatus 10 and displays the generated part or the like on the display screen of the display device. On the other hand, an audio output device converts audio signals that include reproduced voice data, acoustic data, and the like into analog signals and outputs the signals.

The storage device 919 is a device for data storage configured as an example of a storage unit of the information processing apparatus 10. The storage device 919 is configured by, for example, a magnetic storage device such an HDD (Hard Disk Drive), a semiconductor storage device, an optical storage device, or a magneto-optical storage device. The storage device 919 stores programs executed by the CPU 901, various kinds of data, various kinds of data acquired from outside, and the like. In the present embodiment, for example, the storage device 919 corresponds to the storage unit 120 shown in FIG. 2 and stores various kinds of information performed in the part generating and using process according to the present embodiment. For example, the storage device 919 stores information regarding a photo or a frame used to generate the part, the generated part, or the like.

Also, although not shown in FIG. 2, the information processing apparatus 10 may have each of the following configurations.

The communication device 921 is a communication interface configured by a communication device or the like to be connected to, for example, a communication network (network) 927. The communication device 921 is a communication card for, for example, a wired or wireless LAN (Local Area Network), Bluetooth (registered trademark), or a WUSB (Wireless USB). In addition, the communication device 921 may be a router for optical communication, a router for ADSL (Asymmetric Digital Subscriber Line), a modem for various kinds of communication, or the like. The communication device 921 can transmit and receive signals and the like based on a predetermined protocol, for example, TCP, IP, or the like with, for example, the Internet or other communication devices. Furthermore, the network 927 connected to the communication device 921 is configured by a network to which connection is made in a wired or wireless manner, and may be, for example, the Internet, a household LAN, infrared communication, radio wave communication, satellite communication, or the like. In the present embodiment, for example, the network 927 corresponds to the network 30 shown in FIGS. 1 and 3 and the information processing apparatus 10 can cause the communication device 921 to transmit and receive various kinds of information to and from another information processing apparatus 10, the application management server 20, the part management server 40, or the like via the network 927. For example, the communication device 921 can transmit and receive various kinds of information necessary to execute an application by performing communication with the application management server 20 via the network 927. Also, for example, the communication device 921 can transmit and receive various kinds of information regarding generation or management of the part by performing communication with the part management server 40 via the network 927.

The drive 923 is a reader/writer for recording media, and built in or externally connected to the information processing apparatus 10. The drive 923 reads information recorded on the removable recording medium 929 such as a magnetic disk, an optical disc, a magneto-optical disc, or a semiconductor memory loaded therein, and outputs the information to the RAM 905. In addition, the drive 923 can also write various kinds of information on the removable recording medium 929 such as a magnetic disk, an optical disc, a magneto-optical disc, or a semiconductor memory loaded therein. The removable recording medium 929 is, for example, a DVD medium, an HD-DVD medium, a Blu-ray (registered trademark) medium, or the like. Furthermore, the removable recording medium 929 may be a CompactFlash (CF) (registered trademark), a flash memory, an SD memory card (Secure Digital memory card), or the like. Moreover, the removable recording medium 929 may be, for example, an IC card (Integrated Circuit card) on which a non-contact-type IC chip is mounted, an electronic device, or the like. In the present embodiment, the information processing apparatus 10 can read various kinds of information relating to the part generating and using process according to the present embodiment from the removable recording medium 929 or write the information on the removable recording medium 929 via the drive 923.

The connection port 925 is a port for connecting other external devices directly to the information processing apparatus 10. As an example of the connection port 925, there is a USB (Universal Serial Bus) port, an IEEE 1394 port, an SCSI (Small Computer System Interface) port, or the like. As another example of the connection port 925, there is an RS-232C port, an optical audio terminal, an HDMI (High-Definition Multimedia Interface) (registered trademark) port, or the like. By connecting the externally connected device 931 to the connection port 925, the information processing apparatus 10 can acquire various kinds of information directly from the externally connected device 931, or provide various kinds of information to the externally connected device 931. In the present embodiment, the information processing apparatus 10 can acquire various kinds of information relating to the part generating and using process according to the present embodiment from the externally connected device 931 or output such information to the externally connected device 931 via the connection port 925.

Also, although not shown in FIG. 8, the information processing apparatus 10 may have the following configuration. For example, the information processing apparatus 10 may include a sensor device that detects a use status of an application executed by the information processing apparatus 10. The sensor device is, for example, a detection part such as a sensor that detects a motion of the information processing apparatus 10 or a sensor that acquires positional information indicating a current position. Examples of the sensor device include a motion sensor device such as a triaxial acceleration sensor device such as an acceleration sensor device, a gravity detection sensor device, or a fall detection sensor device or a triaxial gyro sensor device such as an angular speed sensor device, a hand-shake correction sensor device, or a geomagnetic sensor device and a GPS sensor device. Also, the sensor device may include various known measurement devices such as a thermometer, an illuminometer, and a hygrometer in addition to the above-described devices. In the present embodiment, for example, the sensor device corresponds to the use environment detection unit 160 shown in FIG. 2. Also, the information processing apparatus 10 may include a power supply device (battery device) that supplies power to each of the foregoing configurations of the information processing apparatus 10. For example, various secondary cells such as lithium ion secondary cells are applied to the power supply device.

Hereinabove, the example of the hardware configuration that can realize the functions of the information processing apparatus 10 according to an embodiment of the present disclosure has been introduced with reference to FIG. 8. The constituent elements described above may be configured using general-purpose members, or may be configured by software specified in the functions of the constituent elements. Thus, the hardware configuration to be used can be appropriately changed according to technical levels whenever the present embodiment is implemented.

Note that a computer program for realizing the functions of the information processing apparatus 10 according to the present embodiment as described above can be produced or installed in a personal computer or the like. In addition, a recording medium on which such a computer program is stored and which can be read by computers can also be provided. The recording medium is, for example, a magnetic disk, an optical disc, a magneto-optical disc, a flash memory, or the like. In addition, the computer program may be distributed via, for example, a network without using a recording medium.

6. CONCLUSION

As described above, in the present embodiment, the following advantages can be obtained.

In the present embodiment, the part generation unit 112 generates the part that is suitable for a predetermined application and that includes at least a portion of any photo and is displayed on the display screen by the application. Then, the application control unit 111 displays the part generated by the part generation unit 112 on the display screen during the execution of the application. Thus, in the present embodiment, the user can use the photo in the application more simply by using the photo as one part of the application. Accordingly, the convenience of the user at the time of the use of the application is improved. Also, in the present embodiment, the generation condition setting unit 113 appropriately sets the generation condition of the part. Since the part desired by the user is generated by setting the generation condition according to the intention of the user, the convenience of the user at the time of the use of the part is further improved.

Specifically, when the application is an instant messenger and photo data is attempted to be delivered to a partner in the general instant messenger, the instant messenger and the photo data are not linked, that is, the photo data is not information under the management of the instant messenger. Accordingly, when the photo data is transmitted and received, it is necessary for the user to go through the trouble of designating the storage area in which the photo data desired by the user is stored or changing the data size or the format of the photo data to a format appropriate for the transmission and reception depending on the data size or data format of the photo data. Therefore, there is a probability of smooth communication being interrupted. On the other hand, in the present embodiment, by processing the photo data to the part suitable for the instant messenger, the photo data can be used as one part of the instant messenger. Since the part is suitable for a predetermined application, the part is stored in a predetermined storage area easily accessed by the application, under the management of the application. Also, when the part is generated from the photo data, the data size or the data format is changed to a format suitable for use in the application. Accordingly, in the part generating and using process according to the present embodiment, the generated part, that is, the photo data, can be used more simply in the application, thereby improving the convenience of the user.

The preferred embodiments of the present disclosure have been described in detail above with reference to the appended drawings, but embodiments of the present disclosure are not limited to the examples. It should be understood by those skilled in the technical field of the present disclosure that various modifications or corrections may be made within the technical spirit and essence described in the claims and are, of course, construed to pertain to the technical scope of the present disclosure.

For example, as described above, the instant messenger serving as an application to which the part generating and using process according to the present embodiment is applied has been described as an example, but the part generating and using process according to the present embodiment can also be applied to other applications. For example, as described in the foregoing <2. Configuration of information processing apparatus>, the part generated through the part generating and using process according to the present embodiment may be used as a pictograph of mail software or may be used as display of a face of an avatar of an online game. Thus, the part generating and using process according to the present embodiment can be applied to all of the applications as long as the applications are applications by which a photo can be displayed on a display screen. The part according to the present embodiment can be used instead of a photo in the application.

Additionally, the present technology may also be configured as below.

(1) An information processing apparatus including:

a part generation unit configured to generate a part that is suitable for a predetermined application and that includes at least a portion of any photo and is displayed on a display screen at a time of execution of the application; and an application control unit configured to control the execution of the application and at least display the part on the display screen during the execution of the application.

(2) The information processing apparatus according to (1), further including:

a generation condition setting unit configured to set a generation condition for generating the part, wherein the part generation unit generates the part based on the generation condition set by the generation condition setting unit.

(3) The information processing apparatus according to (2), wherein the generation condition setting unit sets the generation condition based on at least one of an operation input by a user, use environment information indicating an execution status of the application, and display information displayed on the display screen during the execution of the application by the application control unit.

(4) The information processing apparatus according to any one of (1) to (3), wherein the part is a stamp which is attachable to any position on the display screen during the execution of the application and in which a predetermined frame is attached to the photo.

(5) The information processing apparatus according to (4), wherein the part generation unit generates the stamp based on the frame and the photo selected by a user.

(6) The information processing apparatus according to (4), wherein the part generation unit extracts a photo containing a face of a person from photos stored in a storage unit and generates the stamp based on the extracted photo containing the face of the person.

(7) The information processing apparatus according to (6), wherein the part generation unit further extracts a photo containing a predetermined expression from the extracted photo containing the face of the person and generates the stamp based on the extracted photo containing the predetermined expression.

(8) The information processing apparatus according to (4), wherein the part generation unit selects at least one of the photo and the frame based on display information displayed on the display screen during the execution of the application and generates the stamp.

(9) The information processing apparatus according to (4), wherein the part generation unit selects at least one of the photo and the frame based on use environment information indicating an execution status of the application and generates the stamp.

(10) The information processing apparatus according to (9), wherein the use environment information is at least one of information regarding weather during the execution of the application, positional information regarding a current position of the information processing apparatus, and temporal information regarding a current time.

(11) The information processing apparatus according to any one of (4) to (10),
wherein the application is a communication tool in which at least one of text information and image information is exchanged between a plurality of users, and
wherein the application control unit displays, on the display screen, a timeline in which predetermined areas displaying at least one of the text information and the image information are arranged and displayed in a predetermined direction in chronological order of the exchange between the users, and displays the stamp to be superimposed on any area of the timeline.

(12) The information processing apparatus according to any one of (1) to (3), wherein the part is a background image displayed as a background on the display screen during the execution of the application.

(13) The information processing apparatus according to (12), wherein the part generation unit generates the background image based on display information displayed on the display screen during the execution of the application.

(14) The information processing apparatus according to (12) or (13),
wherein the application is a communication tool in which at least one of text information and image information is exchanged between a plurality of users, and
wherein the application control unit displays, on the display screen, a timeline in which predetermined areas displaying at least one of the text information and the image information are arranged and displayed in a predetermined direction in chronological order of the exchange between the users, and displays the background image as a background of the timeline.

(15) The information processing apparatus according to (14),
wherein the part generation unit selects the photo based on at least one of the text information and the image information exchanged between the users and generates the background image, and
wherein the application control unit displays the generated background image as a background of the timeline after one of the text information and the image information leading to generation of the background image.

(16) The information processing apparatus according to any one of (1) to (15), further including:
an imaging unit configured to take the photo,
wherein the part generation unit generates the part based on the photo taken by the imaging unit during the execution of the application.

(17) The information processing apparatus according to (16),
wherein the part is a stamp which is attachable to any position on the display screen during the execution of the application and in which a predetermined frame is attached to the photo, and
wherein the frame is displayed on a finder of the imaging unit when the imaging unit takes the photo to be used to generate the part.

(18) The information processing apparatus according to any one of (1) to (15), further including:
a storage unit configured to store at least the photo,
wherein the part generation unit generates the part based on the photo stored in the storage unit.

(19) A part generating and using method including:
generating a part that is suitable for a predetermined application and that includes at least a portion of any photo and is displayed on a display screen at a time of execution of the application; and
controlling the execution of the application and at least displaying the part on the display screen during the execution of the application.

(20) A program causing a computer to realize:
a function of generating a part that is suitable for a predetermined application and that includes at least a portion of any photo and is displayed on a display screen at a time of execution of the application; and
a function of controlling the execution of the application and at least displaying the part on the display screen during the execution of the application.

What is claimed is:

1. An information processing apparatus, comprising:
a storage device configured to store a plurality of image data elements and a plurality of frames; and
at least one processor configured to:
control execution of an application;
select a first image data element of the plurality of image data elements and a first frame of the plurality of frames, based on a generation condition,
wherein the first frame includes at least one of text information or feeling information;
generate a stamp corresponding to the application, based on the selection of the first image data element and the first frame;
adjust at least one of a size of the stamp and a rotational angle of the stamp;
control a display screen to display a timeline corresponding to the application; and
control the display screen to superimpose the generated stamp on the displayed timeline.

2. The information processing apparatus according to claim 1, wherein the at least one processor is further configured to:

set the generation condition; and
generate the stamp based on the set generation condition.

3. The information processing apparatus according to claim 2, wherein
the at least one processor is further configured to:
control the display screen to display specific information; and
set the generation condition based on at least one of a user operation, use environment information, or the displayed specific information, and
the use environment information indicates an execution status of the application.

4. The information processing apparatus according to claim 1, wherein
the at least one processor is further configured to:
attach the selected first frame to at least a portion of the selected first image data element; and
adjust a display position of the stamp on the display screen, and
the stamp includes the at least the portion of the selected first image data element and the selected first frame attached to the at least the portion of the selected first image data element.

5. The information processing apparatus according to claim 1, wherein the at least one processor is further configured to:
extract a second image data element from the plurality of image data elements, wherein the extracted second image data element includes a face of a person; and
generate the stamp based on the extracted second image data element.

6. The information processing apparatus according to claim 5, wherein
the extracted second image data element includes the face of the person having an expression, and
the at least one processor is further configured to generate the stamp based on the extracted second image data element that includes the face of the person having the expression.

7. The information processing apparatus according to claim 1, wherein the at least one processor is further configured to:
control the display screen to display specific information;
select a second image data element from the plurality of image data elements and a second frame from the plurality of frames, based on the displayed specific information; and
generate the stamp based on the selection of the second image data element and the second frame.

8. The information processing apparatus according to claim 1, wherein the at least one processor is further configured to:
select a second image data element from the plurality of image data elements and a second frame from the plurality of frames, based on use environment information indicating an execution status of the application; and
generate the stamp based on the selection of the second image data element and the second frame.

9. The information processing apparatus according to claim 8, wherein the use environment information includes at least one of weather information during the execution of the application, positional information regarding a current position of the information processing apparatus, or temporal information regarding a current time.

10. The information processing apparatus according to claim 1, wherein the application corresponds to a communication tool in which at least one of the text information or image information is exchangeable between a plurality of users.

11. The information processing apparatus according to claim 1, wherein the at least one processor is further configured to:
generate the stamp that includes a background image; and
control the display screen to display the background image as a background on the display screen.

12. The information processing apparatus according to claim 11, wherein the at least one processor is further configured to:
control the display screen to display specific information; and
generate the background image based on the displayed specific information.

13. The information processing apparatus according to claim 11, wherein
the application corresponds to a communication tool in which at least one of the text information or image information is exchangeable between a plurality of users, and
the at least one processor is further configured to control the display screen to display the background image as a background of the timeline.

14. The information processing apparatus according to claim 13, wherein the at least one processor is further configured to:
select a second image data element from the plurality of image data elements based on at least one of the text information or the image information exchanged between the plurality of users;
generate the background image based on the selected second image element; and
control the display screen to display the generated background image as the background of the timeline.

15. The information processing apparatus according to claim 1, further comprising:
a camera configured to capture a second image data element of the plurality of data elements at a time of the execution of the application,
wherein the at least one processor is further configured to generate the stamp based on the second image data element captured at the time of the execution of the application.

16. The information processing apparatus according to claim 15, wherein the at least one processor is further configured to:
display a second frame of the plurality of frames on a finder of the camera at a time of the capture of the second image data element; and
generate the stamp based on the second frame displayed on the finder of the camera.

17. An information processing method, comprising:
in an information processing apparatus that includes a storage device and at least one processor:
storing, in the storage device, a plurality of image data elements and a plurality of frames;
controlling, by the at least one processor, execution of an application;
selecting, by the at least one processor, an image data element of the plurality of image data elements and a frame of the plurality of frames, based on a generation condition,
wherein the frame includes at least one of text information or feeling information;

generating, by the at least one processor, a stamp corresponding to the application, based on the selection of the image data element and the frame;

adjusting, by the at least one processor, at least one of a size of the stamp and a rotational angle of the stamp;

controlling, by the at least one processor, a display screen to display a timeline corresponding to the application; and controlling, by the at least one processor, the display screen to superimpose the generated stamp on the displayed timeline.

18. A non-transitory computer-readable medium having stored thereon computer-executable instructions, that when executed by a processor, cause the processor to execute the operations, the operations comprising:

storing a plurality of image data elements and a plurality of frames;

controlling execution of an application;

selecting an image data element from the plurality of image data elements and a frame from the plurality of frames, based on a generation condition, wherein the frame includes at least one of text information or feeling information;

generating a stamp corresponding to the application, based on the selection of the image data element and the frame;

adjusting at least one of a size of the stamp and a rotational angle of the stamp;

controlling a display screen to display a timeline corresponding to the application; and controlling the display screen to superimpose the generated stamp on the displayed timeline.

* * * * *